TRANSMISSION SYSTEM-SELECTION BY PERMUTATION OF PARITY CHECKS

Filed Feb. 19, 1959 14 Sheets-Sheet 1

INVENTORS W. T. REA A. W. ROBERTS
BY John E. Cassidy
ATTORNEY

TRANSMISSION SYSTEM-SELECTION BY PERMUTATION OF PARITY CHECKS

Filed Feb. 19, 1959 14 Sheets-Sheet 2

INVENTORS W. T. REA
A. W. ROBERTS
BY John E. Canady
ATTORNEY

TRANSMISSION SYSTEM-SELECTION BY PERMUTATION OF PARITY CHECKS

Filed Feb. 19, 1959 14 Sheets-Sheet 3

INVENTORS W. T. REA
A. W. ROBERTS
BY John E. Cassidy
ATTORNEY

INVENTORS W. T. REA
A.W. ROBERTS
BY John E Cassidy
ATTORNEY

TRANSMISSION SYSTEM-SELECTION BY PERMUTATION OF PARITY CHECKS

INVENTORS W. T. REA
A. W. ROBERTS
BY John E Cassidy
ATTORNEY

TRANSMISSION SYSTEM-SELECTION BY PERMUTATION OF PARITY CHECKS

INVENTORS W.T. REA A.W. ROBERTS

BY John E. Cassidy

ATTORNEY

INVENTORS W. T. REA
A. W. ROBERTS
BY John E. Cassidy
ATTORNEY

TRANSMISSION SYSTEM-SELECTION BY PERMUTATION OF PARITY CHECKS

Filed Feb. 19, 1959 14 Sheets-Sheet 8

INVENTORS W. T. REA
A.W. ROBERTS
BY John E. Cassidy
ATTORNEY

INVENTORS W. T. REA
A. W. ROBERTS
BY John E Cassidy
ATTORNEY

TRANSMISSION SYSTEM-SELECTION BY PERMUTATION OF PARITY CHECKS

Filed Feb. 19, 1959 14 Sheets-Sheet 10

INVENTORS W. T. REA
A. W. ROBERTS
BY John E Cassidy
ATTORNEY

TRANSMISSION SYSTEM-SELECTION BY PERMUTATION OF PARITY CHECKS

INVENTORS W. T. REA
A. W. ROBERTS
BY John E Cassidy
ATTORNEY

TRANSMISSION SYSTEM-SELECTION BY PERMUTATION OF PARITY CHECKS

Filed Feb. 19, 1959 14 Sheets-Sheet 12

INVENTORS W. T. REA
A. W. ROBERTS
BY
John E. Cassidy
ATTORNEY

TRANSMISSION SYSTEM-SELECTION BY PERMUTATION OF PARITY CHECKS

Filed Feb. 19, 1959 14 Sheets-Sheet 13

INVENTORS W. T. REA
A. W. ROBERTS
BY
John E Cassidy
ATTORNEY

TRANSMISSION SYSTEM-SELECTION BY PERMUTATION OF PARITY CHECKS

INVENTORS W. T. REA
A. W. ROBERTS
BY John E Cassidy
ATTORNEY

United States Patent Office 3,064,080

Patented Nov. 13, 1962

3,064,080
TRANSMISSION SYSTEM-SELECTION BY PERMUTATION OF PARITY CHECKS

Wilton T. Rea, Bernardsville, and Allen W. Roberts, South Plainfield, N.J., assignors to Bell Telephone Laboratories, Incorporated, New York, N.Y., a corporation of New York Filed Feb. 19, 1959, Ser. No. 794,328
5 Claims. (Cl. 178—23)

This invention is an improved code-signaling system, in which the improvement consists in arranging a circuit which performs a parity checking function and which has heretofore been employed solely to increase the accuracy in the reception of code signals, so that the circuit may perform an additional function; namely: the function of representing an address code for selecting one out of a plurality of receiving stations.

An object of the invention is to arrange a parity checking circuit in a code-signaling system so that it performs an additional function.

Parity checking is applied to multi-element two-condition code-signaling permutations to permit checking a received permutation for plausibility before accepting it. As a specific example let it be assumed that the basic code signals to which a parity signal element is to be added to each permutation as transmitted are five-element two-condition signals. By this is meant that each permutation as transmitted employs five signal elements to convey the intelligence and that each of the signal elements may be of either of two conditions, which will hereinafter be termed the "0" and the "1" condition. Ordinarily, in transmitting a message, a number of permutations each cooperatively defining a symbol such as a letter are transmitted in succession. To permit the checking of the permutations for plausibility when received, a sixth element, which is the parity checking element, will be added to each permutation as transmitted so that each permutation in the message as transmited will consist of six rather than of five signal elements. When parity checking was employed heretofore, in one possible arrangement, it would be agreed in advance that the sixth element which was added to each five-element permutation would always be either a "1" or a "0" signal element as required to make the total number of "1's" in each permutation as transmitted an odd number of "1's." At the receiving end the receiver would test to insure that each parity encoded train would have an odd number of "1's." If a received train had an even number of "1's" it would be rejected as implausible.

It should be obvious that there are different arrangements which might be employed in encoding a permutation to include a parity checking element. The final element which is added could be arranged to make the total number of 1's odd or even. The receiver would obviously be arranged to test for the particular one of the parity checks applied at the transmitter. Heretofore once it was decided to employ a particular one of the possible parity checking arrangements, the same checking arrangement was used throughout. The parity arrangement which was adopted at the transmitter would be made known at the receiving stations and all of the receivers would be arranged to apply the corresponding check to all permutations in each received message.

The present arrangement proposes an improvement over the heretofore known parity checking arrangement so that, by means of varying the parity check encoding and decoding, the circuit may perform another function in addition to the parity check.

It should be apparent from the foregoing that the parity checking arrangement as presently used avails itself of only one of the possible freedoms in applying a parity check to a particular permutation. Instead of consistently applying a particular parity check to all of the permutations of a message, that is to say, instead of arranging so that each permutation transmitted is encoded with an odd number of "1's," for instance, it is possible to assign an individual sequence of parity checks to selected successive permutations, so that the different parity check sequences would afford different permutations. In a simplified system, for instance, it might be agreed to assign the first two permutations in the message for this purpose. These two combinations when arranged for different kinds of parity would provide new permutations in addition to the parity checking feature. These permutations could be employed to perform another function. It might be agreed, for instance, that variations in the parity checks applied to these first two permutations in the messages could be employed as an address to identify a particular one of four stations connected to a single telegraph line. For instance, by prearrangement, in calling the first station, say station A, the first permutation would be encoded with odd parity and the second permutation would be encoded with odd parity. In calling station B the first permutation would be encoded with odd parity and the second permutation would be encoded with even parity. In calling station C the first permutation would be encoded with an even parity and the second permutation would be encoded with an odd parity. In calling station D the first permutation would be encoded with an even parity and the second permutation would be encoded with an even parity. Equipment at each of the four stations, A, B, C, and D, would be arranged to receive the entire message only if the parity conditions individual to each station were met when the first two encoded permutations were received; otherwise, the entire message would be rejected.

Attention is called to the fact that in a larger system wherein one of a large number of stations was to be identified to receive a message, more than two permutations might be encoded. This would permit expansion of the identifiable stations without limit. Attention is also called to the fact that in applying the present invention, the code signal permutations afforded by applying permutations of various parities to a sequence of permutations may be employed to effect a selection and the responding mechanism could be arranged to perform any desired function.

A feature of the invention is a transmitting circuit equipped with means to apply an individual permutation of parity checks to a sequence of permutations.

Another feature of the invention is a receiver having means for applying an individual permutation of parity checks to a sequence of permutations.

Another feature of the invention is a transmitter equipped with a parity selector responsive to a station register which applies an individual permutation of parity checks to a succession of permutations.

Another feature of the invention is a receiver having a logic gate jointly responsive to a program counter and to a "1's" counter which controls the reception of a sequence of received permutations which have been permutatively encoded with an individual sequence of parity checks.

Another feature of the invention is a receiver employing a shift register equipped with a shift inhibiting circuit to inhibit the registration of parity checking elements in the shift register.

As a specific illustration of how the present invention may be applied to identify each of four stations, A, B, C, and D, it will be assumed that a message which is to be transmitted comprises two encoded signal groups or permutations each having four information-bearing binary digits. That is to say, the message consists of two "characters" only. Each of the characters is defined by a code signal permutation having four signal elements only, each of which elements may be of either of two conditions. To each of these code permutations a single two-condition parity checking element is added. The parity checking element is added to insure that the code permutation as transmitted is not accepted if the parity check is not met at the receiver. It is also added to perform an additional function, that is to insure that it is received by one station and one station only, namely, the station to which it is directed.

The following table, Table I, which shows the binary numbers and the decimal equivalents from "0" to "15" is presented as an aid in understanding the invention.

TABLE I

| Binary: | Decimal | Binary: | Decimal |
|---|---|---|---|
| 0000 | 0 | 1000 | 8 |
| 0001 | 1 | 1001 | 9 |
| 0010 | 2 | 1010 | 10 |
| 0011 | 3 | 1011 | 11 |
| 0100 | 4 | 1100 | 12 |
| 0101 | 5 | 1101 | 13 |
| 0110 | 6 | 1110 | 14 |
| 0111 | 7 | 1111 | 15 |

It will be assumed that the intelligence in the message, as distinguished from the address contained in the parity check, consists of two numbers. The first number is 9 and the second number is 13. This intelligence, that is the number 9 and the number 13, is to be sent to station A by transmitting the four element binary permutations for 9 and for 13. From the above table, the binary permutation for 9 is 1001 and for 13 is 1101. To the binary permutation 1001 defining the decimal number 9, a parity checking element is to be added. To the binary permutation 1101 defining the number 13 another parity checking element is to be added. In order to identify station A it will be agreed that an odd binary checking criterion is applied to each permutation. Referring to the binary permutation for the decimal 9, 1001, it will be seen that there are two "1's" in the permutation. In order to make the first permutation have an odd number of 1's it is necessary to add an additional 1 to the permutation. The first five elements to be transmitted therefor which define the numeral 9 and the added parity element which protects the number 9, and partially identifies station A, are 10011. These five elements are to be followed without interruption by the code permutation defining the number 13 together with its parity checking element protecting the number 13 and completing the identification of station A. Since an odd criterion is to be applied to the permutation defining 13 also, and there are three 1's in the permutation, the parity checking element will be a 0. The four elements defining 13 and the fifth element affording protection to the number 13 and completing identification of station A are 11010. We therefore have a train of ten elements as follows: 1001111010.

If the above signal train were transmitted without further protection and there were an error therein, it would be erroneously accepted by some one of the four stations. In order to guard against this, the whole permutation is now subjected to a further parity check. This is done by adding a final element, the eleventh element in the train. Obviously either of the two possible parity checks might be employed for this purpose. The eleventh element in the present arrangement is chosen so that it always makes the total number of 1's in the train odd, to insure the plausibility of the entire train before acceptance by the receiver. This particular check plays no part in identifying a called station.

Refer to the ten elements in the foregoing train. There are six 1's therein. In order that the total train contain an odd number of 1's, it is necessary that the eleventh element be a 1, making a total of seven 1's in the train. So the eleven elements as transmitted in sequence without interruption are 10011110101.

It will be assumed that all stations receive the message without error. Station A applies 3 parity checks. The first one is applied to the first five elements. The second parity check is applied to the second five elements and the third parity check is applied to all eleven elements. An odd parity check is applied in each instance and it is met in each instance so the whole train is accepted. The parity checking elements are discarded and the numbers 9 and 13 are stored. It should be apparent that if the message is received correctly, the third parity check is met at each receiver.

When station B tests the message it applies an odd parity check to the first group of five elements and an even parity check to the second group of five elements. The first parity check is met. The second parity check fails and the message is rejected.

Station C applies an even parity check to the first group of five elements and an odd parity check to the second group of five elements. The first parity check fails; the second parity check is met. The message is rejected.

Station D applies an even parity check to the first group of five elements and an even parity check to the second group of five elements. Neither check is met and the message is rejected.

Now let it be assumed that all stations receive the foregoing train but that the sixth digit is erroneous. Thus the train as received is 10011010101.

Station A applies three odd checks. The first is applied to the first group of five digits which is met. The second check is applied to the second group of five digits. This fails because there are two 1's in the second group of five digits. Therefore the tenth digit should be a 1 to meet the odd parity check. The third check which is applied by station A to the entire train fails because there are six 1's in the entire train and there should be an odd number of 1's. Station A therefore rejects the message.

Station B rejects the message because the overall parity check fails to meet its criterion, although both groups check, that is to say, an odd check which is applied to the first group of five elements is met, the even check which is applied to the second group of five elements is met, but the odd check is applied to the entire combination fails.

Station C, which applies an even check to the first group, an odd check to the second group and an odd check to the entire train, rejects the message because none of three checks is met.

Station D applies an even check to the first group of five elements which fails. It applies an even check to the second group of five elements which is met and it applies an odd check to the whole eleven elements which also fails. Station D therefore rejects the message.

In general, the system of utilizing permutations of the parity bit to perform an address function can be used to select one out of $2^n$ stations, where $n$ is the number of parity checks. For example, if "$n$" equals 3, $2^n$ equals $2^3$ or 8 and one out of eight stations may be selected uniquely. This is apparent from Table II following.

TABLE II

| Station | First Parity Check | Second Parity Check | Third Parity Check |
|---|---|---|---|
| 1 | even | even | even. |
| 2 | do | do | odd. |
| 3 | do | odd | even. |
| 4 | do | do | odd. |
| 5 | odd | even | even. |
| 6 | do | do | odd. |
| 7 | do | odd | even. |
| 8 | do | do | odd. |

This assumes that any message will be discarded as a result of a single parity failure.

The groups of bits checked by a given parity permutation may be of different lengths.

From the foregoing it should be apparent that using the maximum number of possible permutations for selection would cause any permutation of the correct number of bits to be accepted by some receiver, even though the permutation was in error and not intended for the particular receiver which accepts it. This would destroy the checking power of the parity bits.

The checking power of the parity will be maintained by limiting the permutations of odd and even parity checks to pairs of parity bits or by adding an additional parity bit.

The invention may be understood from the following description when taken with reference to the associated drawings which together show a preferred embodiment in which the invention is presently incorporated. It is to be understood, however, that the invention may be incorporated in other embodiments which will be suggested to those skilled in the art from a consideration of the following.

In the drawings, FIG. 1 shows in diagrammatic form the circuit of the transmitter, the various major components being indicated by captioned rectangles.

FIG. 2 shows in diagrammatic form the circuit of the receiver, the various major components being indicated by captioned rectangles.

FIGS. 3, 4, 5, and 6 show the detailed drawings of the transmitter.

FIGS. 7, 8, 9, and 10 show the detailed drawings of the receiver.

*General Description of Transmitter*

Figure 1:
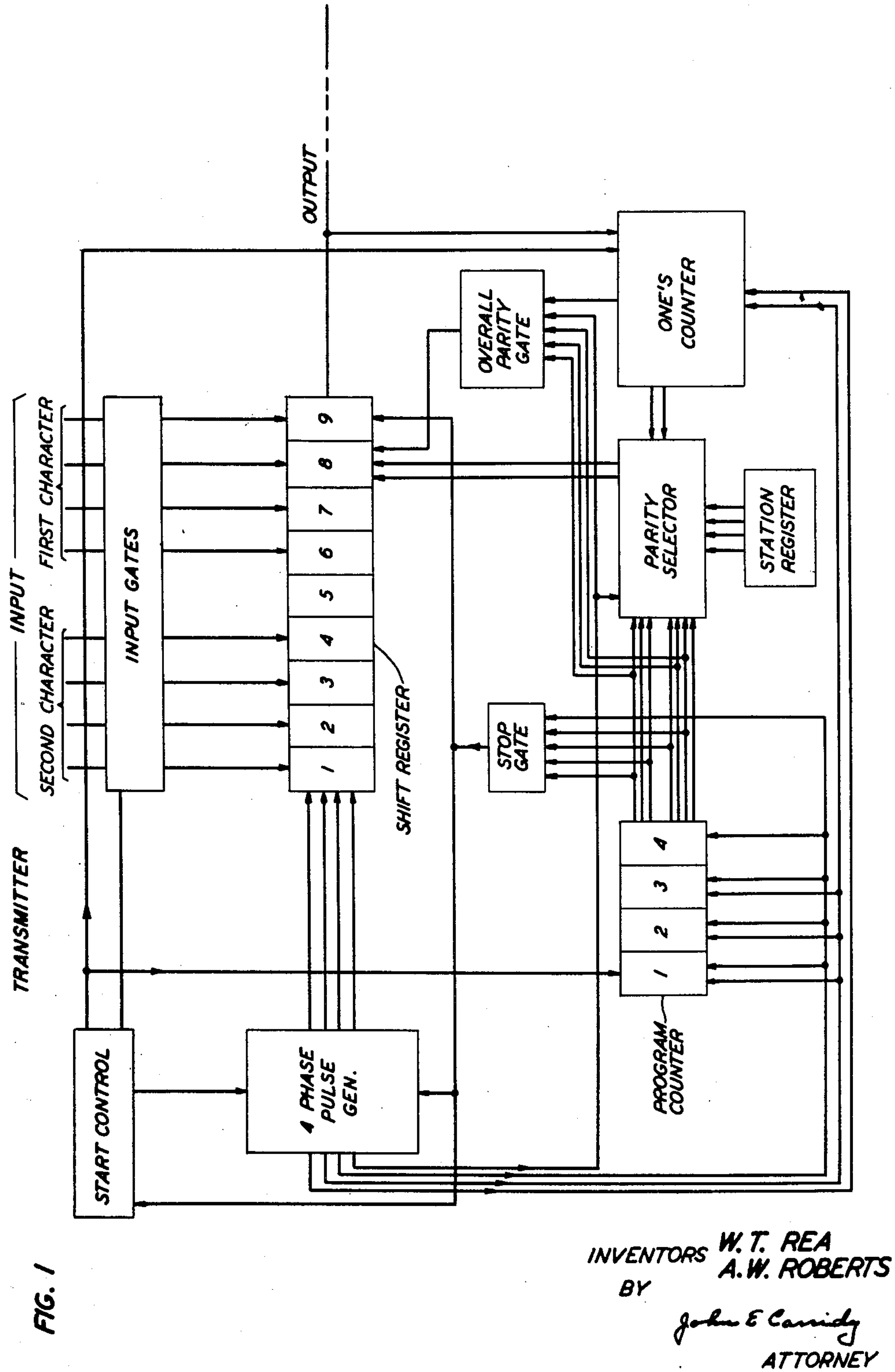

Refer now to FIG. 1 which shows the transmitter of the present system in diagrammatic form. The components of the transmitter are indicated by captioned rectangles which will be described in detail hereinafter. The operation of the transmitter will now be described broadly with relation to FIG. 1.

In the upper middle portion of FIG. 1 there is shown a bracket labeled "Input." The input to the present system may be any one of a number of arrangements, well known in the art, all of which are capable of simultaneously transmitting two four-element two-condition signal permutations to the input gates shown in the upper portion of FIG. 1. One permutation is applied to the four right-hand conductors identified as "First Character," the second permutation is applied to the four left-hand conductors labeled "Second Character." These two permutations are applied simultaneously through the input gates under control of the start control circuit to the shift register circuit shown in the middle of FIG. 1. The shift register circuit is also well known in the art. For present purposes it may be described as a multi-stage device capable of temporarily storing a plurality of signal elements each of which signal elements may be of either one of two conditions. The plurality of signal elements are read into the shift register simultaneously in parallel and are then read out one element at a time in sequence. The shift register in FIG. 1 has nine stages, numbered 1 through 9. The eight elements from the input gates are transferred into stages 1 through 4, and 6 through 9 simultaneously. No signal element is read into stage 5 initially. After storage in the register the signal elements are moved progressively toward the right, one stage during each signal unit time cycle, and applied in sequence to the output conductor, shown extending toward the right in FIG. 1. The timing of the progress of the signal elements through the shift register stages is under control of the four-phase pulse generator shown at the left in FIG. 1. The four-phase pulse generator applies four pulses to the shift register during each individual signal unit time cycle.

Figure 3:
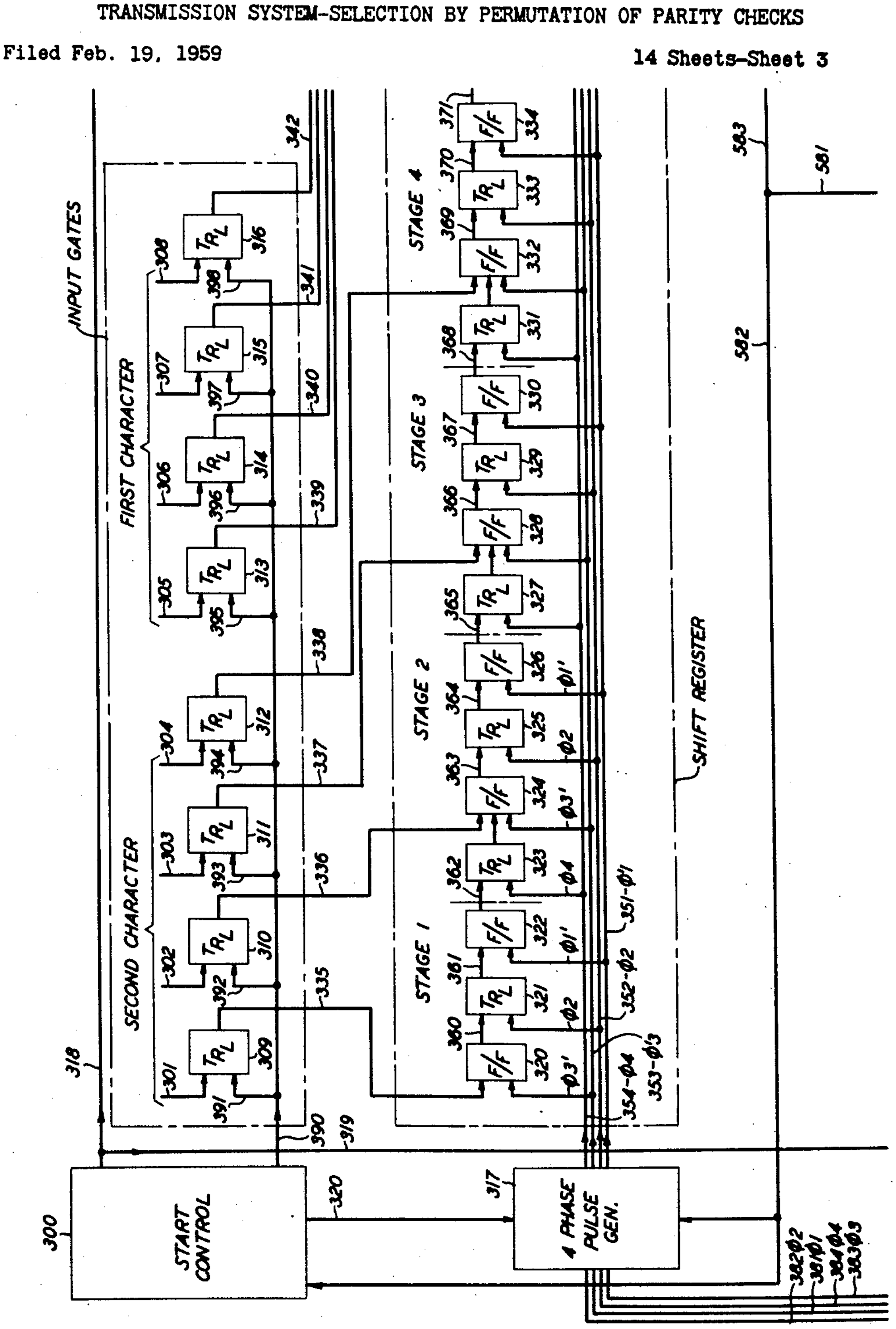

As may be seen from reference to FIG. 3, each stage of the register comprises two flip-flop circuits designated F/F. These flip-flop circuits are each bistable, two-condition, transistor, multivibrator circuits. One function of the four-phase pulse generator shown at the left in FIG. 1 is to control the shifting of the signal elements from the left-hand flip-flop of each stage of the register to the right-hand flip-flop in the same stage and also to control the shifting from the right-hand flip-flop of one stage to the left-hand flip-flop of the succeeding stage of the register.

Before the shifting of the permutations of the first and second characters into the shift register, all nine stages of the shift register are set in the 0 condition. After the first and second characters are shifted into the shift register, since no element is shifted into stage 5, stage 5 will remain in the 0 condition. Each of the other eight stages of the register will be either in the 1 condition or in the 0 condition, depending upon the particular permutations which are shifted into the register. Stage 5 of the shift register, which is originally set in the 0 condition, is reserved, so to speak, for the parity element which is to be added to the first character. It will be observed that no stage of the register is available originally for the parity element to be applied to the second character, and no stage is available for the parity element which is to be added to the whole train to define the overall parity of the eleven elements comprising each train. During each individual complete one of each four-phase signal element cycle, following parallel read-in of the first and second characters into the shift register, the contents of each individual stage will be moved from the left-hand flip-flop to the right-hand flip-flop in its respective stage and then to the left-hand flip-flop of the succeding stage. As a result of this each signal element stored in the shift register will be moved progressively toward the right, one stage during each four-phase cycle, and applied in sequence to the output conductor. The first signal element which will be applied to the output conductor will be the signal element which is first stored in stage 9 of the register. The signal element which is first stored in stage 9 will be impressed on the line during a portion of the first cycle following its transfer to the shift register from the input gates. During the fourth phase of this same cycle the signal elements in each stage of the register will be moved one stage toward the right and the signal element in stage 9 of the register will be changed to the next signal element. During each succeding four-phase signal cycle, another signal condition stored in the succeeding stages of the register, from right to left, will be applied to the output conductor. During the first phase of each four-phase signal interval, while a signal element reposes in stage 9 of the register, it will be read to determine whether it is a 1 or a 0. The signal elements in the first character which are 1's will be counted by the 1's counter, shown at the bottom right in FIG. 1. By the time the signal element which was originally stored in stage 6 of the shift register has reached stage 9 and before the end of the first phase of the signal time unit interval while it is stored therein and is being applied to the output conductor, the number of 1's in the first four-element permutation character will have been counted by the 1's counter. The 1's counter, therefore, at this time is able to provide an indication of whether there are an odd or an even number of 1's in the first character. When the signal element originally stored in stage 6 of the shift register is in stage 9 of the shift register, the 0 condition in which stage 5 of the shift register was originally set, before parallel read-in of the two permutations from the input gates, will have been transferred progressively toward the right and will occupy the right-hand flip-flop in stage 8.

It has been explained that in the present invention the parity condition, that is whether odd or even parity, which is applied to a character is dependent upon the parity address permutation assigned to the particular one of the stations to which the message is addressed. In order to achieve this, the transmitter of FIG. 1 is equipped with a station register. The station register comprises two transistor flip-flop circuits. These can be set in such manner as to control the parity selector shown immediately above the station register in FIG. 1. The parity selector is controlled so that it will apply the permutations of the parity conditions required to identify the particular called station to the permutation for the first character and to the permutation for the second character. Each parity signal element, of such condition as is required, as determined by the cooperative action of the 1's counter and the station register circuit, is applied to the right-hand flip-flop circuit of stage 8 of the shift register when the final signal element of the character to which the parity element is being added occupies stage 9 of the register.

The parity selector must be controlled in such manner that it applies the proper parity condition to stage 8 of the shift register at the proper count. This is performed by the program counter shown at the lower left in FIG. 1. The program counter is a four-stage counter since it is required to count to 11. As is well understood a binary counter having $n$ stages will count to a maximum of $2^n$, a counter having three stages will count a maximum of $2^3$ which is equal to 8, and a counter having four stages will count a maximum of $2^4$ which is equal to 16. Therefore, since a three-stage counter is not adequate, a four-stage counter is required. In the present arrangement, as will be made clear hereinafter, each of the first three stages of the program counter has two multivibrators or flip-flop circuits whereas the fourth stage has but one. The program counter controls the parity selector so that it inserts the proper parity signal elements, as determined by the cooperating circuitry, at counts 5 and 10. It also controls the overall parity gate so that it impresses the proper overall parity signal element in stage 8 of the shift register at count 11. It further controls the stop gate so that it stops a program and erases the signal condition prevailing in stage 9 of the shift register at the end of the program. It is pointed out that, when the eleventh signal element of a train occupies stage 9 of the shift register, each of stages 1 to 8, inclusive, will be in the 0 condition, so that it is necessary only to change the condition of stage 9 if the eleventh signal element of the train is a one-condition signal element. All nine stages of the register will then be in the 0 condition awaiting the start of the succeeding program. The program counter also applies a condition through the stop gate to stop the start control circuit.

It is particularly pointed out that the program counter starts counting with each one of its four stages registering 0 which is equivalent to a decimal count of 0. The counter advances to binary count 1 and to each succeeding binary count under control of the four-phase pulse generator on each phase four pulse which is the last pulse of each four-phase cycle. During the first, second and third phase of each four-phase signal interval, the program counter will therefore register, in binary, a number which is one less than the number of the time cycle. Thus during signal cycle 4, and until the reception of the phase four pulse therein, the program counter will register a binary count of three which is 0011.

Phase three of the fourth time cycle activates a gate in the parity selector circuit which will place a one-condition in the right-hand flip-flop circuit of stage 8 of the shift register if the parity bit which is to be added to the first character of the message is to be a 1. The parity bit which is added to the first character of the message will be a 1 if the message is going to station A or B and the one's counter has counted as even number of 1's. If the one's counter has counted an odd number of 1's, the parity bit will be a 1 only if station C or D is to receive the message. During the fourth phase of the fourth cycle, the correct parity bit set into the right-hand flip-flop of the eighth stage of the shift register is gated to the last stage, stage 9, of the shift register. This bit is then applied to the output conductor during the first three phases of cycle 5 and is then changed during the fourth phase of cycle 5.

The output during cycle 6 through 9 will be the information bits of the second character of the message. In the ninth cycle the one's counter is again interrogated to determine the parity bit for the second character. The one's counter up this time has counted the 1's in nine bit positions. The first five of these bits will always be odd if the message is going to stations A or B and will always be even if the message is going to stations C or D. Since the specific receiver is designated by the state of the station register circuit, this information will determine the number of 1's in the second character. Actually this logic is wired into the parity selector so that during the ninth time cycle the correct parity bit will be set into the right-hand flip-flop of the eighth stage of the shift register. The parity bit pattern developed by this system is shown in Table 3 below.

TABLE 3

| Station | Parity of Characters | | State of one's Counter | 1st Par. Bit | 2nd Par. Bit | Overall Par. Bit |
|---|---|---|---|---|---|---|
| | First | Second | | | | |
| A | Odd | Odd | 0 | 1 | 0 | 1 |
| | | | 1 | 0 | 1 | 0 |
| B | do | Even | 0 | 1 | 1 | 1 |
| | | | 1 | 0 | 0 | 0 |
| C | Even | Odd | 0 | 0 | 1 | 1 |
| | | | 1 | 1 | 0 | 0 |
| D | do | Even | 0 | 0 | 0 | 1 |
| | | | 1 | 1 | 1 | 0 |

The wiring of the logic circuits to develop the parity bits was developed from Table 3. It will be explained in connection with the description of the parity selector, hereinafter.

As stated in the foregoing, the parity signal element applied to the entire train, called herein the overall parity bit, does not depend upon the destination of the message and is always 1 if the one's counter has counted an even number of 1's so as to make the total number of 1's in the eleven-element train odd. The correct overall parity bit is gated by the overall parity gate, shown at the lower right in FIG. 1, into the right-hand flip-flop of the eighth stage of the shift register by the phase 3 pulse of the tenth cycle. Phase 4 of the tenth cycle gates the overall parity bit into the last stage of the shift register where this bit is applied to the outgoing line, thus becoming the transmitter output. On the fourth phase of the eleventh cycle the stop gate clears the last stage of the shift register, setting the transmitter output to zero.

The description of the control signals for the message cycle and the description of the logical diagrams are furnished hereinafter.

*General Description of Receiver*

Figure 2:
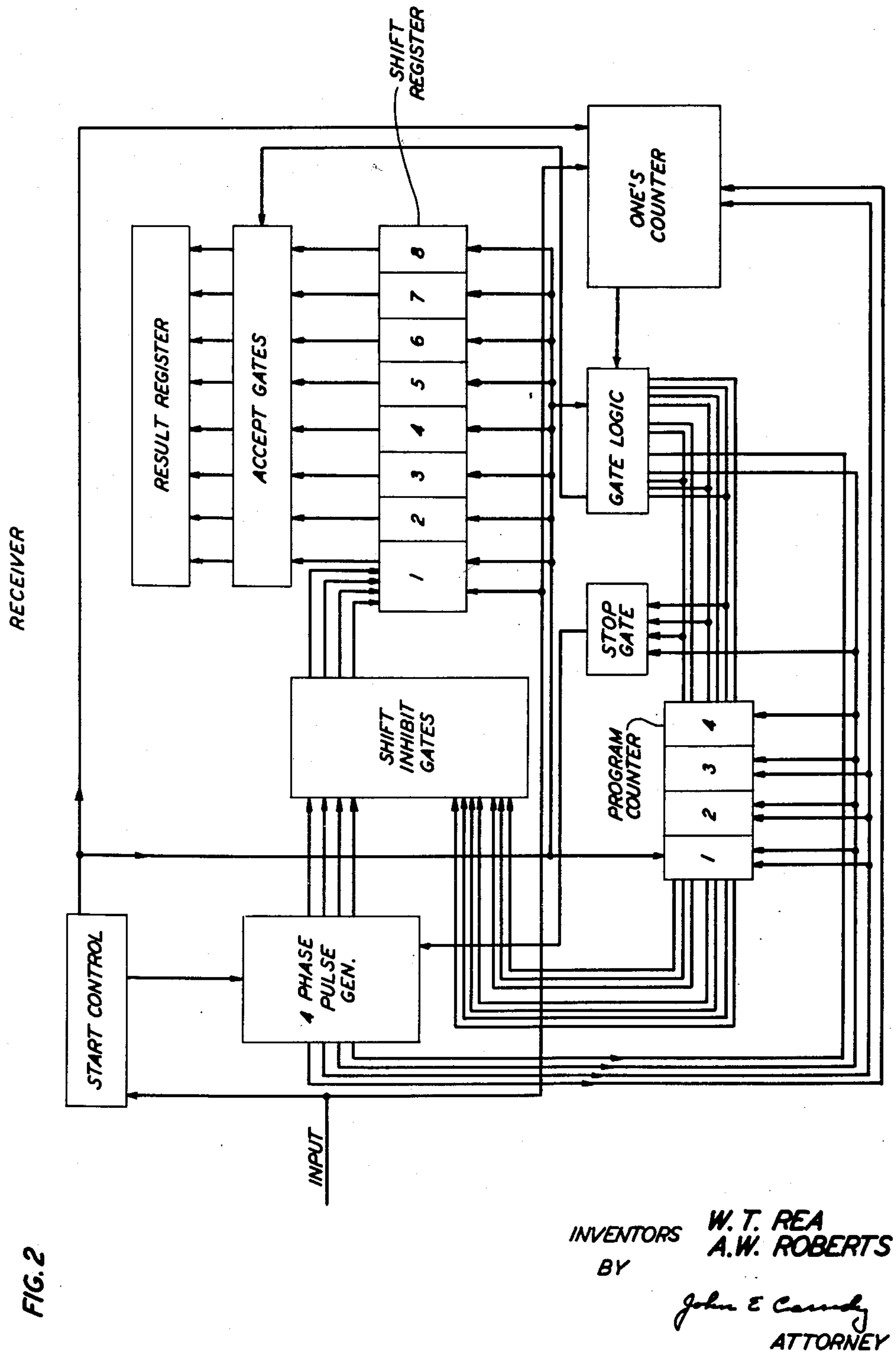

Refer now to FIG. 2 which shows a diagram of the receiver.

The receiver of FIG. 2 is designed to work with the transmitter described in the foregoing. It is assumed that a start signal will be received by the start control circuit. The start control circuit will clear the program counter, the one's counter, and the shift register. It resets the logic gate and starts the four-phase pulse generator.

The first message bit is gated into the first stage of the shift register during the first cycle and if this bit is a 1 it will cause the 1's counter to advance. This bit is shifted one stage to the right in each of the next three cycles as new message bits are gated itno the first stage of the shift register and counted in the 1's counter if they are 1's.

The program counter which controls the operation of the gates which are activated or inhibited during a given cycle is identical with the program counter described for the transmitter.

During the fifth cycle, for reasons explained, the reading of the program counter will be 0100, or 4. At this time the shift inhibit gates inhibit the shifting of the bits already stored in the shift register and also inhibit the fifth bit from being read into the shift register. However, this fifth bit, if it is a 1, is counted in the 1's counter. After the fifth bit has been counted in the 1's counter, the counter is interrogated and if the count is not correct for the proper parity, for the particular receiving station, an inhibit flip-flop is set in the logic gate unit shown in the lower middle portion of FIG. 2. The inhibit flip-flop will be set if any one of the three parity checks fails and will inhibit the accept gates which are interposed between the shift register and the result register in which the results are finally stored.

The sixth through ninth cycles will place the next four message bits in the shift register. The tenth and eleventh cycles are similar to the fifth. The message bit is not gated into the shift register and the data in the shift register is not shifted. After the message bit has advanced the 1's counter, if the message bit is a 1, the 1's counter is interrogated to detect a parity failure.

On the fourth phase of the eleventh time cycle, the program counter will change from 1010 to 1011. This change will activate a gate in the gate logic circuit if no parity failure has occurred. This gate signal is inverted and used to activate the accept gates. The accept gates gate the information bits to the receiver or the result register as it is indicated in FIG. 2, as an accepted message. The operation of the receiver is described in detail hereinafter.

*Transistor Logic Unit and Flip-Flop Circuit*

Figure 12B:
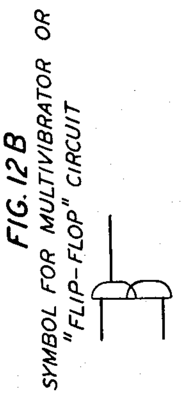
FIG. 12A is the symbol therefor and FIG. 12B is the symbol for a multivibrator or flip-flop circuit F/F also used throughout the system.
Figure 12A:
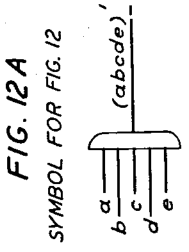
Figure 12:
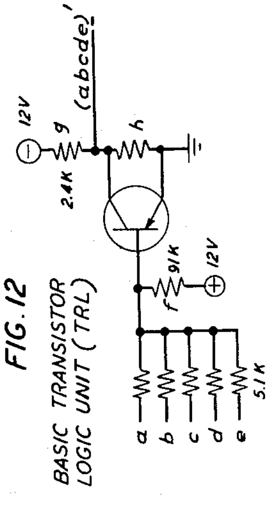
FIG. 12 is the basic circuit for a transistor logic unit TRL which is employed throughout the system.

Refer now to FIG. 12 which shows the basic transistor logic unit of the system and to FIG. 12A which shows the symbol therefor employed in the circuits of the components. In the transmitter and receiver FIGS. 3 to 6 and 7 to 10, inclusive, respectively, the transistor logic unit is represented by a rectangle designated TRL. The unit consists of one positive-negative-positive or PNP transistor in the grounded emitter configuration. As shown in FIG. 12, the emitter of the transistor is directly grounded. One to five input resistors designated *a* to *e*, inclusive, may be employed. These are shown connected to the base of the transistor. The output of the collector, which is the logic unit output conductor, is designated (*a, b, c, d, e*)'. The base of the transistor in each unit is connected through a biasing resistor *f* to positive battery. The collector in each unit is connected through resistor *g* to negative battery. The emitter is also connected to the collector through a resistor *h*. The resistors *f* and *h* are employed to improve the switching time. Although, in the arrangement shown in FIG. 12, five resistors designated *a* through *e* are shown connected to the base of the transistor, as employed generally in the circuit of the system, there may be any number of resistors, from one to five, actually used instead of the five shown. The transistor shown in FIG. 12 is intended to be driven, that is to say, changed from one to another of its two possible conditions, conducting or non-conducting, by connection to another element which will ordinarily be another similar transistor. The connections are made from the collector of the driving transistors to one of the base resistors of the driven transistor. When a control, such as the collector of a transistor connected to any of resistors *a, b, c, d*, or *e*, is at a negative potential, the control is considered to be in the Off condition. Under such circumstances, the driven transistor is put into the conducting condition, or as it is termed, is turned on. When a driven transistor is turned on, the impedance across it between its emitter and collector becomes very low and it may be assumed that ground on the emitter is in effect connected directly to the collector, which is the output conductor of the transistor. Attention is particularly called to the fact that, in order to turn any transistor on, it is necessary to apply negative potential to only one of the resistors, such as any of resistors *a* to *e*, connected to its base. In producing the opposite condition, however, that is in turning a transistor to the off, or non-conducting, condition it is necessary that none of the resistors, such as resistors *a* to *e*, connected to base of the transistor be connected to negative battery. In other words, in order to turn off a transistor, all of the resistors connected to its base must be connected to ground. Under this condition the transistor is non-conducting and the output furnished through the collector lead is at negative potential or off ground as it is at times termed herein. To turn on a transistor it is necessary to apply negative battery to one base resistor only.

From the foregoing it should be apparent that the logic unit of FIG. 12 is an "Or" gate to negative current. By this is meant that the transistor will be turned on if negative battery is connected to any one or the other of resistors *a* to *e*. It is an AND gate to ground signals. By this is meant that each of the resistors *a, b, c, d*, and *e*, which may be connected to the base at any time, must be connected to ground in order to turn the transistor off. Of course, it should be understood from the foregoing that fewer than five resistors may be connected to the base of a transistor and that the transistor will be turned off if ground is connected to all such resistors. The value of the constants of the basic logic unit may advantageously be as shown in FIG. 12.

Following one widely used convention the output of the logic unit of FIG. 12 is the prime of the product of the inputs or the sum of the primes of the inputs. In applying this convention it is considered that ground equals one. According to this convention, if a ground were connected to each of resistors *a, b, c, d*, and *e*, each input would be considered to be 1. The product of the inputs would therefore be $1\times1\times1\times1\times1$ or 1 and the output would be the prime of 1 by which is meant the opposite condition from the 1 condition, which is the 0 condition. In other words, when all grounds, or all 1's are applied to the base the output is a negative potential condition on the collector, which is considered an 0 condition. By the "sum of the primes of the inputs" is meant that if an input is a 1 it is changed to a 0 and the output when all inputs are ground are the sums of all the 0's or 0.

In following the description of the operation of the circuits of the system it is only necessary to understand that the negative potential condition, called the "off ground signal," which is termed the "zero" signal is the dominant signal. If any input through any resistor to the base of a transistor is 0 the transistor is turned on and the output from its collector is a ground signal, which is considered a "1" signal. When all of the inputs to the base of a transistor are ground, or 1's, the transistor is off, that is non-conducting, and the output from its collector is a negative potential signal, or an off ground signal, or a 0 signal.

In the circuits of the components and in the circuit of FIGS. 3 to 6 and 7 to 10, inclusive, wide use is made of a combination of two transistors known in the art as a multivibrator and more generally called a "flip-flop" circuit. When one of the pairs of transistors in a flip-flop circuit is conducting, the other is non-conducting. Each transistor is under the control of the other by means of a connection from the collector of each to the base of the other. The flip-flop circuit forms a two-state memory device that can be changed from one state to another by the application of negative potential, or an off ground, or zero signal, as it is called herein, to the base of the transistor which is in the non-conducting condition. This turns on the theretofore non-conducting transistor.

In the component circuits a multivibrator is represented by the symbol shown in FIG. 12B in which two of the symbols of FIG. 12A are partially overlapped. This indicates that the collector of each is connected to the base of the other, in the well-known manner, to form a flip-flop circuit. In FIG. 12B the base of each transistor is represented by the vertical line and the collector of each is represented by an arcuate line in each connected to the base of the other. The input to each transistor is represented by the left-hand horizontal line connected to its base. The output is represented by a single horizontal line extending from the collector of the upper transistor. In certain cases as shown on the drawings of the components there may be several inputs connected to the base of one or the other or both of the transistors and an individual output from each. The conditions governing the transistor's condition are the same as described for the basic logic unit of FIG. 12.

In FIGS. 3 to 10 the flip-flop circuit is represented by a rectangle designated F/F.

*Detailed Description of Transmitter*

Figure 4:
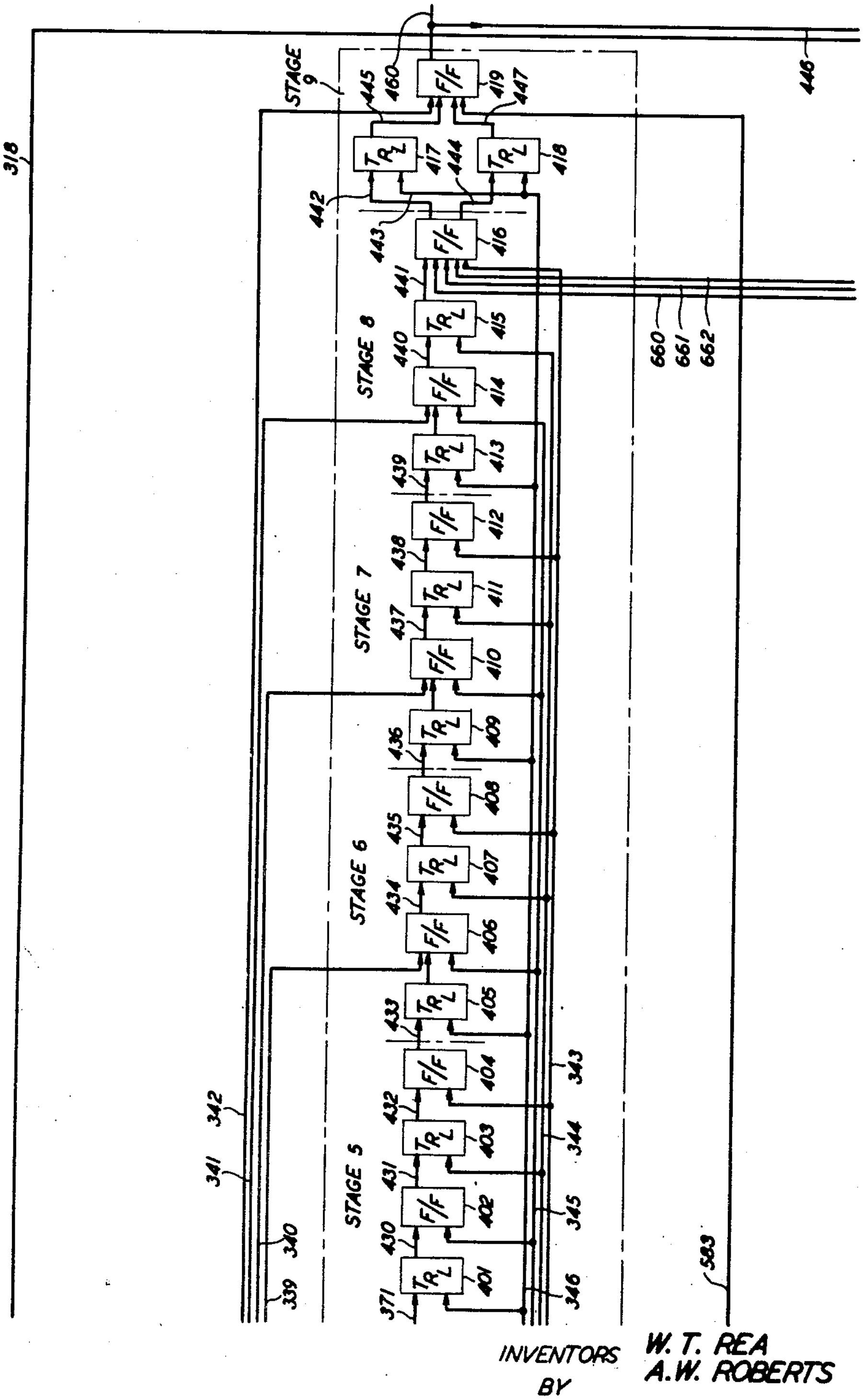
Figure 5:
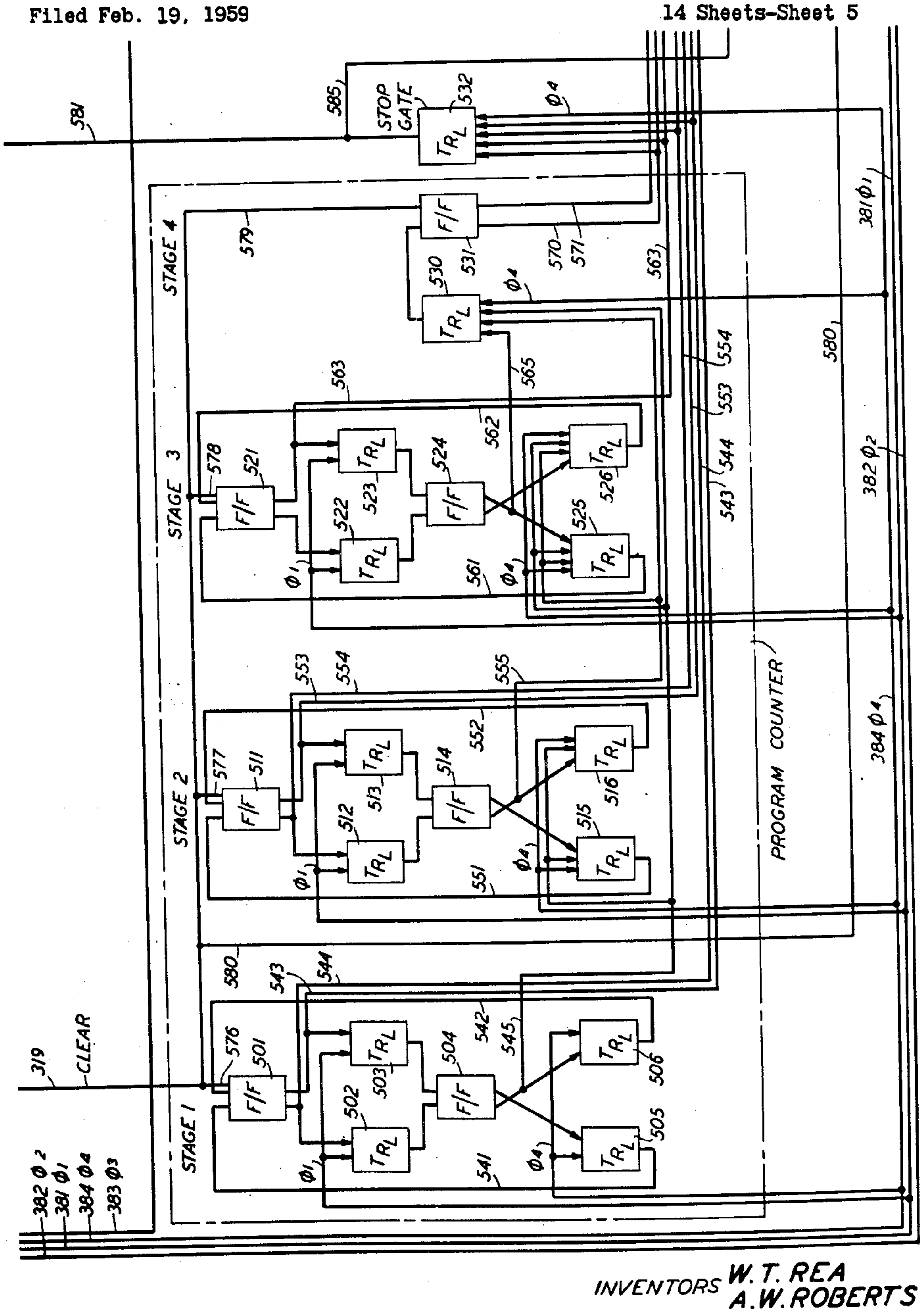
Figure 6:
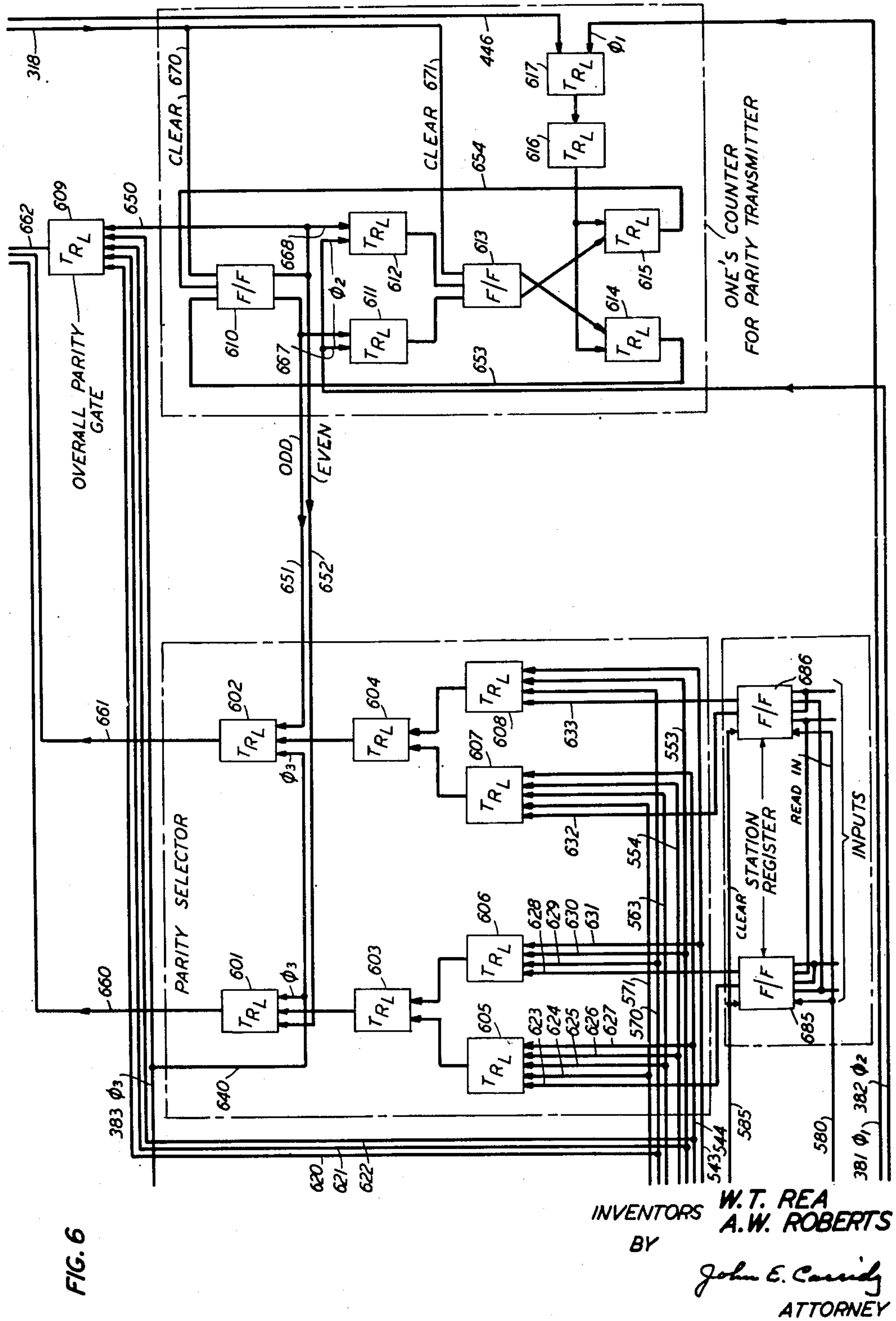
Figure 11:
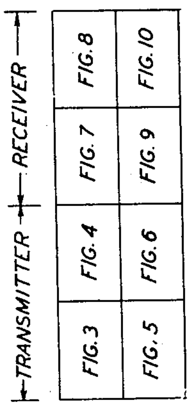
FIG. 11 is a diagram showing how FIGS. 3 to 10, inclusive, are disposed in relation, one to another, to form a complete system comprising a transmitter and receiver.

Refer now to FIGS. 3, 4, 5 and 6 which, taken together and disposed as in FIG. 11, show the transmitter circuit. First to identify the components in the figures, in the upper left in FIG. 3 the start control circuit 300 is shown. At the lower left the four-phase pulse generator 317 is shown. In the upper portion of FIG. 3 there are shown eight rectangles each designated TRL and numbered 309 through 316, inclusive. These are the input gates for the first and second character. In the middle portion of FIG. 3 and in FIG. 4 the transmitting shift register is shown. The transmitting shift register comprises nine stages. Of these, stages 1 through 4 are shown in FIG. 3 and stages 5 through 9 are shown in FIG. 4. FIG. 5 shows the four-stage program counter designated stage 1 through stage 4. In the middle right-hand portion of FIG. 5 is shown the stop gate 532. In FIG. 6 at the left is shown the parity selector and below it is the station register. The 1's counter is shown at the right in FIG. 6, above the 1's counter is shown the overall parity gate.

*Transmitter Control*

The transmitter of FIG. 3, 4, 5, and 6 is controlled by the start control circuit 300 and the four-phase pulse generator 317. Such circuits are well known in the art. The start control circuit furnishes the pulses which set up the logic in the transmitter to send out a message. The four-phase generator circuit furnishes the gating signals.

The start control circuit furnishes negative signals of sufficient duration to clear the flip-flop circuits. It also furnishes ground signals of sufficient duration to gate information into a flip-flop circuit. The duration of the clearing signals may be 0.4 microsecond, for instance, and the duration of the signals which gate the information into the flip-flop circuit may be, for instance, 0.55 microsecond. Signals of such duration are employed in a well-known data processing system.

The four-phase pulse generator furnishes ground signals of sufficient duration to allow a signal to propagate through five logic gates. By this is meant that each one of the grounds furnished by a four-phase pulse generator is long enough to permit five transistors connected in tandem to fire in sequence. Each of these signals may be 1.5 microseconds in duration, for instance. It also furnishes negative voltage signals of sufficient duration to set a flip-flop circuit. These signals may be 0.4 microsecond in duration. It is pointed out, however, that in most applications of the present system intervals of such short duration will not be required. The following transmitting cycle shows the manner in which the foregoing signals are employed.

*Transmitting Cycle*

*I. Start control.*—The start control circuit performs three sets of functions as follows: Before the start of transmission of a train of pulses it clears the program counter. This is performed by impressing a negative voltage condition from the start control circuit 300 in FIG. 3 through conductor 319 which extends into FIG. 5 where it is applied to transistor flip-flop circuits 501, 511, 521 and 531 in stages 1 through 4 of the program counter. This, as will be made clear hereinafter, sets each one of these stages in the 0 condition so that the four-stage program counter cooperatively is set initially in the 0000 binary count condition corresponding to 0 in the decimal count.

A. The start control circuit 300 impresses negative battery through conductor 318 in FIG. 3 which extends through FIG. 4 into FIG. 6 where it is applied through conductors 670 and 671, respectively, to flip-flop circuits 610 and 613 in the 1's counter. In response to this the 1's counter is also set in the 0 condition before the counting of the 1's when transmission of the signal train is started.

B. The start control circuit 300 gates the permutations defining the first and the second character into the shift register. The start control circuit 300 also gates the address into the station register.

C. The start control circuit 300 applies a condition through conductor 320 to start the four-phase pulse generator.

*II. Operation.*—With respect to time, the operation of the transmitter may be considered to be divided into eleven different signal element time slots or cycles, cycle 1 through cycle 11. Each of the time slots or cycles is separable into four subdivisions or phases, phase one, phase two, phase three and phase four, indicated herein at times by the symbols $\phi 1$, $\phi 2$, $\phi 3$ and $\phi 4$. These eleven cycles may be described under seven headings, A through G, inclusive, as follows:

A. CYCLE 1

$\phi 1$ clears the right-hand flip-flop circuit of shift register stages 1 to 8 inclusive.

$\phi 1$ gates the contents of the upper level of the program counter to the lower level.

$\phi 1$ gates the contents of stage 9 of the shift register into the input of the 1's counter as a counting pulse, if the output of stage 9 of the register is a 1 condition signal element.

$\phi 2$ sets the lower level of the 1's counter in the same condition as that of the upper level.

$\phi 2$ sets the right-hand flip-flop of stages 1 to 8, inclusive, of the shift register in the same condition as that of the left-hand flip-flop.

$\phi 3$ clears the left-hand flip-flop of stages 1 to 8, inclusive, of the shift register.

$\phi 4$ sets the left-hand flip-flop of stages 2 to 8, inclusive, of the shift register and the single flip-flop in stage 9 in the same condition as that of the right-hand flip-flop of the next preceding stage.

The last stage of the shift register has a final flip-flop circuit in it and the transfer from the stage 8 is effected by jam setting stage 9.

B. CYCLES 2 AND 3

Same as cycle 1.

C. CYCLE 4

Same as cycle 1 except $\phi 3$ sets the right-hand flip-flop of stage 8 for the proper parity signal for the four signal elements of the first permutation as determined by the 1's counter under control of the program counter.

D. CYCLES 5 THROUGH 8

Same as cycle 1.

E. CYCLE 9

Same as cycle 4.

F. CYCLE 10

Same as cycle 1 except $\phi 3$ sets the right-hand flip-flop of stage 8 of the shift register for the correct parity for the first ten cycles of the train.

G. CYCLE 11

Transmission of program ends in response to a $\phi 4$ signal which stops the pulse generator 317 and clears the last stage of the shift register. Otherwise, the operation during cycle 11 is the same as during cycle 1.

*Input Gates*

Figure 13:
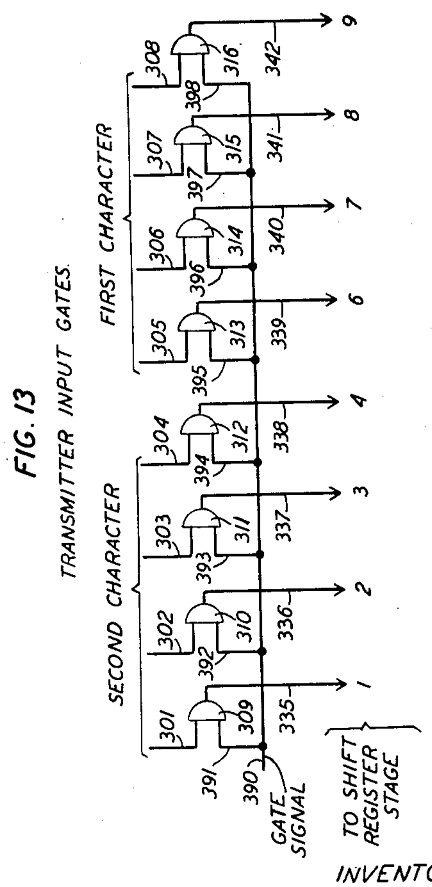
FIG. 13 shows the input gates.

The input gate circuit shown at the top of FIG. 3 comprises eight transistor logic units designated 309 to 316, inclusive. The four signal elements of the first character are impressed through conductors 305 through 308 on units 313 through 316. The four signal elements of the second character are impressed through conductors 301 through 304 on the four units 309 through 312. Each transistor logic unit corresponds to the one shown in FIG. 12 and described in the foregoing. It was explained that the symbol for one of these units is shown in FIG. 12B. FIG. 13 shows eight individual transistor logic units in accordance with the symbol of FIG. 12B which comprise the input gate circuit. These transistor logic units may be considered as "AND" gates. The gates are controlled by the condition of the signal element and also by the condition applied through conductors 390 and 391 through 398 as shown in FIGS. 3 and 13 to the transistor bases. When both of these inputs to any one of these eight transistors are at ground, the transistor will be turned off and its output will be a negative potential or off-ground signal. The output from each logic unit is impressed through an individual conductor of the conductor group 335 through 342 on the left-hand flip-flop of stages 1 through 4 and 6 through 8 and on the single flip-flop of stage 9 of the shift register. Each one of the input leads designated "First Character" and "Second Character" will be at ground if the corresponding signal element is a 1. The gate signal common to all eight transistors is normally in the off-ground condition which places the gate in the conducting condition applying ground to the output conductor such as conductor 335. The gate signal under control of the start control circuit changes to ground, which is applied to conductors 390 and 391 through 398, to pass the incoming characters to the shift register. Under this condition, with an incoming signal element, on any of incoming conductors 301 through 308, which is ground or a one-condition signal element, the incoming signal will be passed through the corresponding conductor of the group of conductors 335 through 342 as a negative potential or off-ground signal and recorded in the shift register stage as a 1 condition. If the incoming signal element is a 0 condition signal element, the negative potential applied to any conductor of the group 301 through 308 will turn on the respective connected transistor of the group of transistors 309 through 316. This will impress ground through the corresponding conductor of the group of conductors 335 through 342 and a 0 condition will be registered in the respective connected stage of the shift register.

*Shift Register*

Figure 14:
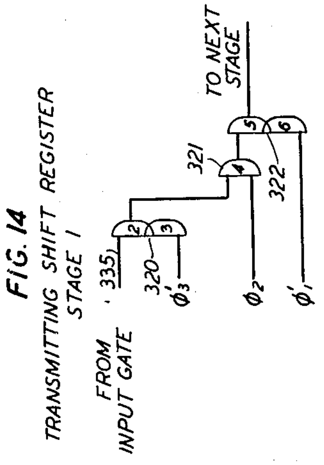
FIG. 14 shows stage one of the transmitting shift register.

The transmitting shift register, shown in FIGS. 3 and 4, is a nine-stage, double-rank register. There are certain variations in the different stages of the register which are shown in accordance with the symbols of FIG. 12A and FIG. 12B in FIGS. 14, 15, 16, and 17. Data are set into stages 1 through 4, and 6 through 9 by the input gates as described in the foregoing. These data are shifted one stage to the right during each four-phase signal cycle. Stage 1 of the shift register is shown in component FIG. 14. It differs from the normal stage in that it has one less transistor logic unit than the normal stage. The reason for this is that signals are set into the first rank of the first stage of the register directly from the input gate only. Each normal register in addition to receiving a signal element from the input gate at the start of a program must be arranged to receive signals from the preceding stage. In order to do this, an individual transistor logic is furnished in each of stages 2 through 8. In the case of stage 9 which has but a single flip-flop circuit, the arrangement is different and will be described separately hereinafter.

Figures 15, 16, 17, 18, 19, 20:
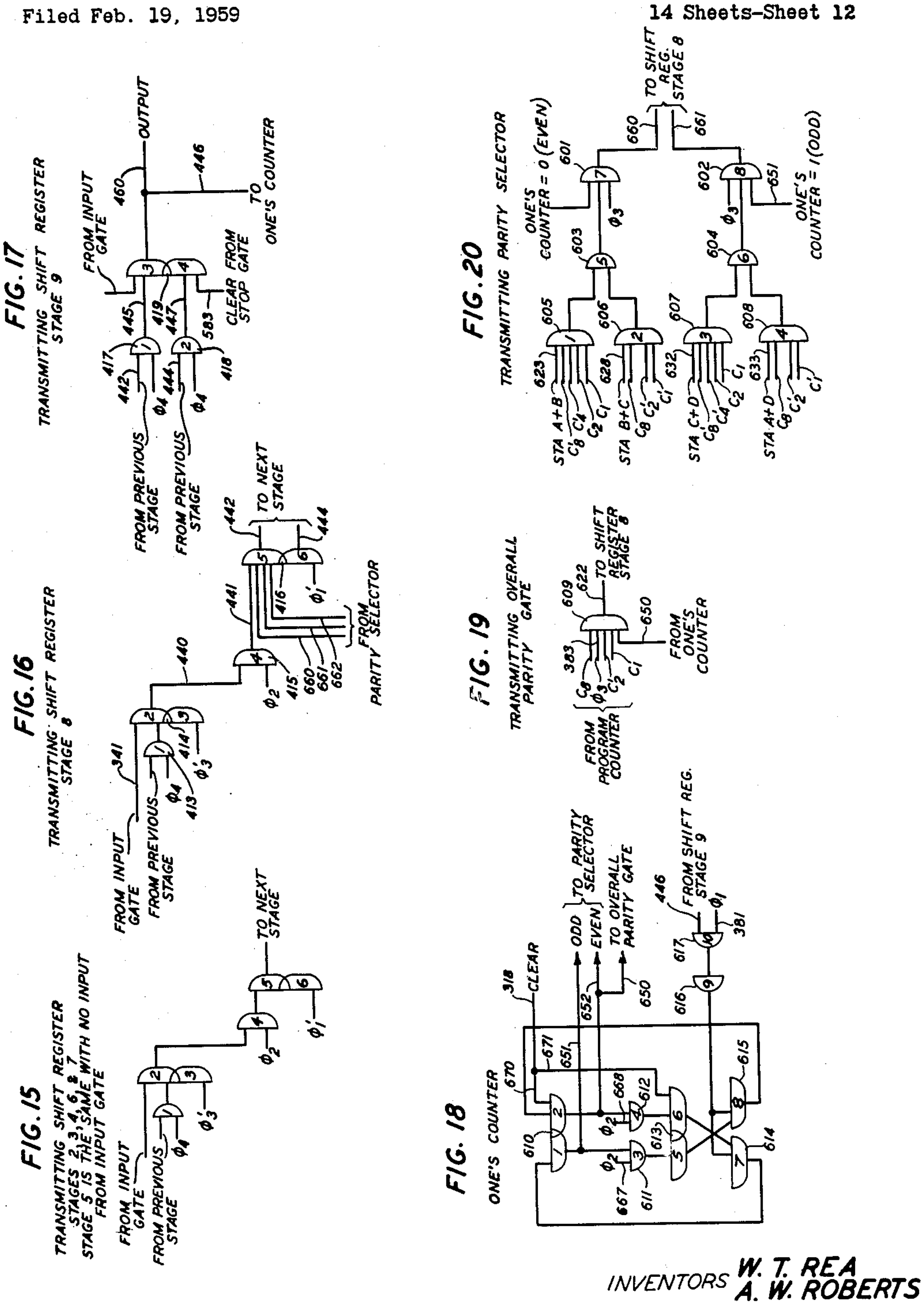
FIG. 15 shows stages two to seven, inclusive, of the transmitting shift register.
FIG. 16 shows stage eight of the transmitting shift register.
FIG. 17 shows stage nine of the transmitting shift register.
FIG. 18 shows the one's counter.
FIG. 19 shows the transmitting overall parity gate.
FIG. 20 shows the transmitting parity selector.

Component FIG. 15 shows stages 2, 3, 4, 6, and 7 of the shift register in accordance with the symbols of FIG. 12A and FIG 12B. Stage 5 is the same as shown in FIG. 15 except that it has no connection from the input gate. Component FIG. 16 shows stage 8 of the shift register. This differs from the other stages in that it is provided with three connections from the parity selector to control the insertion of the three parity signal elements. Stage 9 of the register is shown in component FIG. 17. Stage 9 differs from the normal stages in a number of respects. Most important of these is that it is a single-rank register having a single flip-flop circuit. The reason for this is that it is not necessary to arrange to transfer the output of stage 9 to a succeeding stage. It also has an individual transistor logic unit interconnecting each of the transistors in the right-hand flip-flop circuit to the prevous stage. It differs also in that the output of stage 9 connects to the outgoing line. It differs further in that a connection is made from the output circuit to the one's counter to count the 1 signal conditions among the elements in each of the two characters in the train.

The shifting cycle in response to the application of the four pulses supplied by the four-phase pulse generator during each individual signal element interval may be explained from reference to the general stage of the shift register as shown in component FIG. 15. As mentioned in the foregoing, each of the general stages has two flip-flop circuits. These are shown in FIG. 15 in accordance with the convention of FIG. 12B. In each of the normal stages of the shift register shown in FIGS. 3 and 4 two flip-flops are shown designated by the symbol F/F and identified by the symbols such as 324 and 326 in stage 2. The left-hand flip-flop corresponds to transistors 2 and 3 and the right-hand flip-flop corresponds to transistors 5 and 6 both in FIG. 15. A transistor logic unit, such as unit 323 in stage 2 in FIG. 3 is associated with the left-hand flip-flop. This corresponds with transistor 1 in FIG. 15. Another transistor logic unit interconnects the left-hand and the right-hand flip-flops.

This is indicated by unit 325 in stage 2 of FIG. 3 and by transistor 4 in FIG. 15. In FIG. 15 it is indicated that a $\phi'1$ pulse, a $\phi2$ pulse, a $\phi'3$ pulse and $\phi4$ pulse are connected to the bases of transistors 6, 4, 3, and 1, respectively. The connection from the input gate is made to the base of transistor 2. The connection from the previous stage is made to the base of transistor 1. In FIG. 3, $\phi'1$, $\phi2$, $\phi'3$, and $\phi4$ pulses are supplied over conductors 351, 352, 353 and 354, respectively, to corresponding units and flip-flops in the various stages.

During phase one an off-ground signal labelled $\phi'1$, is supplied to the base of transistor 6, turning it on and turning off transistor 5. This sets the right-hand flip-flop in the 0 stage.

During phase two a ground signal, labelled $\phi2$, is applied to the input of transistor 4. If the other input to the base of transistor 4 from the output of transistor 2 is a ground, transistor 4 is turned off. If transistor 4 is turned off, an off-ground signal is applied to the base of transistor 5 turning it on. When transistor 5 goes on transistor 6 will go off.

During phase three an off-ground signal, labelled $\phi'3$, is applied to the base of transistor 3 turning transistor 3 on. Since the other inputs to transistor 2 are ground at this time, when transistor 3 is turned on transistor 2 is turned off.

During phase four a ground signal, labelled $\phi4$, is applied to the input of transistor 1. If the other input to transistor 1 from transistor 5 of the previous stage is a ground signal at this time, transistor 1 is turned off. When transistor 1 is turned off it applies an off-ground signal to the base of transistor 2 turning it on. This sets the left-hand flip-flop in the 1 condition.

This four-phase cycle is the same for all stages of the register except the first, eighth, and ninth stage. As stated in the foregoing the first stage has no transistor 1 and no change of state takes place during $\phi4$.

The eighth stage shown in FIG. 16, as mentioned in the foregoing, has three additional inputs to transistor 5 from the party selector and overall parity gates. These three leads will set the right-hand flip-flop in stage 8 to the 1 condition if the appropriate parity bit is to be a 1.

Stage 9 of the shift register, shown in FIG. 4 and in component FIG. 17, has two transistor logic units, 417 and 418 and a single flip-flop circuit 419. It will be observed that whereas each of the other stages is connected to the preceding stage by means of a single connection, such as by means of conductor 362, between stages 1 and 2, stage 9 is connected to stage 8 through two conductors, conductors 442 and 444. The connections are made as may be seen in FIG. 4 and in FIGS. 16 and 17 from the output of transistors 5 and 6 in stage 8 to the base of transistors 1 and 2, respectively, in stage 9. No shifting is required between ranks in stage 9 as stage 9 has but one rank. The only shifting operation which is required under control of the shift pulse circuit 317 is the transfer of the condition in stage 8 of the register into stage 9. This is performed, as for shifting between all other stages, during phase four. A $\phi4$ ground signal is, therefore, applied to the base of each of transmitters 1 and 2 in stage 9 as shown in FIG. 17. At this time stage 8 may be in either the 0 or 1 condition and the same is true for stage 9. If stage 8 is in the 1 condition ground will be connected to conductor 442 and negative battery to conductor 444. If stage 8 is in the 0 condition these conditions are reversed. To whichever one of transistors 1 or 2 ground is applied to both base connections, that transistor will be turned off and negative battery will be applied to its output conductor 445 or 446, turning on transistor 3 or 4. If transistor 3 has the negative battery applied thereto, it will remain conducting if it was already in the 1 condition or will be turned on if it formerly was in the 0 condition. In either event ground will be applied to output conductor 460 to transmit a 1 condition to the connected outgoing line. If transistor 3 is turned on it will apply ground to the base of transistor 4 and simultaneously ground will be applied through conductor 446, so transistor 4 will be off for a 1 condition stored in stage 9. For the transfer of a 0 condition from stage 8 to stage 9 the conditions applied to the bases of transistors 3 and 4 will be reversed. Transistor 4 will be turned on and transistor 3 will be turned off, applying negative battery to conductor 460 for the 0 output condition.

It will be observed that the condition of the last stage of the register, stage 9, is impressed through conductor 446 on transistor logic unit 617 which serves as the input to the one's counter in FIG. 6. During phase one following the phase four in which a signal condition has been inserted in register stage 9, a $\phi1$ ground signal will be impressed on unit 617. If a ground signal is being applied simultaneously from the shift register output for a 1 condition through conductor 446, the application of the two grounds will enable unit 617 to pass a 1 condition to be counted into the one's counter. This will now be explained in detail.

*One's Counter*

Refer now to the one's counter in FIG. 6 and to component FIG. 18. The one's counter is a single-stage counter having an upper and a lower rank. It is used to indicate that an odd or even number of 1 signal conditions has been passed to the output conductor of the shift register. It counts one in response to a ground or one condition output from the shift register through conductor 446 at the time when a ground pulse is applied from the phase generator as a $\phi1$ pulse through conductor 381. These two ground conditions are applied to the transistor logic unit 617.

The elements in the one's counter circuit in FIG. 6 correspond to the elements shown in corresponding positions in component FIG. 18. There are ten transistors in the circuit. In component FIG. 18, transistors 1 and 2 correspond to the flip-flop 610, transistors 5 and 6 correspond to flip-flop 613 and transistors 3, 4, 7, 8, 9, and 10 correspond to transistor logic units 611, 612, 614, 615, 616, and 617, respectively.

As mentioned heretofore before counting is started, the one's counter is cleared by the application of negative potential from the start control circuit 300 through conductor 318 and conductors 670 and 671, in parallel, to the bases of transistors 2 and 6 in flip-flop 610 and 613, respectively, turning transistors 2 and 6 on and turning transistors 1 and 5 off. This puts the one's counter in the zero condition. With transistors 1 and 5 turned off, negative battery is applied to the bases of transistors 3 and 8 respectively holding them on. If the output of the shift-register is a 1 condition, transistor 10 is turned off by the joint control of the ground applied to inductor 446 and the $\phi1$ pulse. This applies negative battery to the base of transistor 9 in unit 616 turning it on. This applies ground to the bases of transistors 7 and 8 in parallel. With transistors 6 and 9 on, ground will be applied to the two connections to the base of transistor 7 turning it off. This applies negative battery to the base of transistor 1 turning it on and turning off transistor 2. This changes the upper rank of the one's counter from the 0 to the 1 condition. The negative potential from transistor 2 now turns on transistor 4. The ground output from transistor 1 is applied to the base of transistor 3. The four phase pulse generator supplies ground as a $\phi2$ pulse over conductor 382 and conductors 667 and 668 which connect in parallel to the bases of transistors 3 and 4 in logic units 611 and 612. When this $\phi2$ ground is applied to the base of transistor 3 it is turned off its negative battery output applied to the base of transistor 5 turns transistor 5 on. With transistors 4 and 5 on, ground is applied from the collector of each to the base of transistor 6. This turns transistor 6 off. As a result of the foregoing the lower rank of the one's counter has been set in the 1 condition which is the same as that of the upper rank. Transistors 1 and 5 are both conducting and transistors 2 and 6 are off.

In response to the next 1 condition in the output of the register and the $\phi$1 pulse, transistors 10 and 9 will be turned off and on, respectively, and the output of transistor 9 will again apply ground to the bases of transistors 7 and 8, respectively. At this time, with transistor 5 in the on condition, both base connections of transistor 8 will be grounded turning it off and applying negative potential from the output of transistor 8 to the base of transistor 2, turning it on and changing the upper rank of the one's counter back to the 0 condition completing a two-count cycle. The output of the counter is supplied from the collectors of transistors 1 and 2. For the odd count condition, ground is supplied to the odd output conductor 651 to the parity selector while the even output conductor 652 has negative potential applied thereto. For the even count the conditions are reversed. The odd and even output conductors 651 and 652, respectively, are shown in FIG. 6 interconnecting the one's counter to the parity selector. Conductor 650 interconnects the one's counter to the overall parity gate.

*Program Counter*

Refer now to the program counter shown in FIG. 5 and to the circuits showing the components thereof, FIGS. 22, 23, 24, and 25. FIGS. 22, 23, 24, and 25 show stage 1, which is a one-weight counting bit, stage 2 which is a two-weight counting bit, stage 3 which is a four-weight counting bit and stage 4 which is an eight-weight counting bit, respectively. As arranged on the drawings the value of the counting stages increases from left to right whereas in binary notation the reverse is true. The conditions of stages 1, 2, 3 and 4 of the counter represents digits in positions 4, 3, 2 and 1 in a binary number reading from left to right.

It will be observed that counter stages 1, 2, and 3 each have two ranks, an upper and a lower rank, whereas stage 4 has a single rank only. Each of stages 1, 2, and 3 has eight transistors numbered 1 through 8, respectively, and stage 4 has but three transistors numbered 1, 2, and 3. With respect to the relationship of the component figures and FIG. 5, in each of stages 1, 2, and 3, transistors 1 and 2 comprise the upper flip-flop circuit 501, 511 and 521, respectively, and transistors 5 and 6 comprise the lower flip-flop circuit 504, 514 and 524, respectively. Transistors 3 and 4 in stages 1, 2 and 3 are arranged as logic units. These are identified as transistor logic units 502 and 503, in stage 1, 512 and 513 in stage 2 and 522 and 523 in stage 3. These logic units are employed to gate the contents of the upper flip-flop circuit into the lower flip-flop circuit under control of a $\phi$1 pulse. Transistors 7 and 8 in the three stages are logic units 505 and 506 in stage 1, 515 and 516 in stage 2, and 525 and 526 in stage 3. They are employed to reverse the conditions of transistors 1 and 2 in stages 1, 2, and 3 under control of a $\phi$4 counting pulse.

Figures 21, 22, 23, 24, 25, 26:
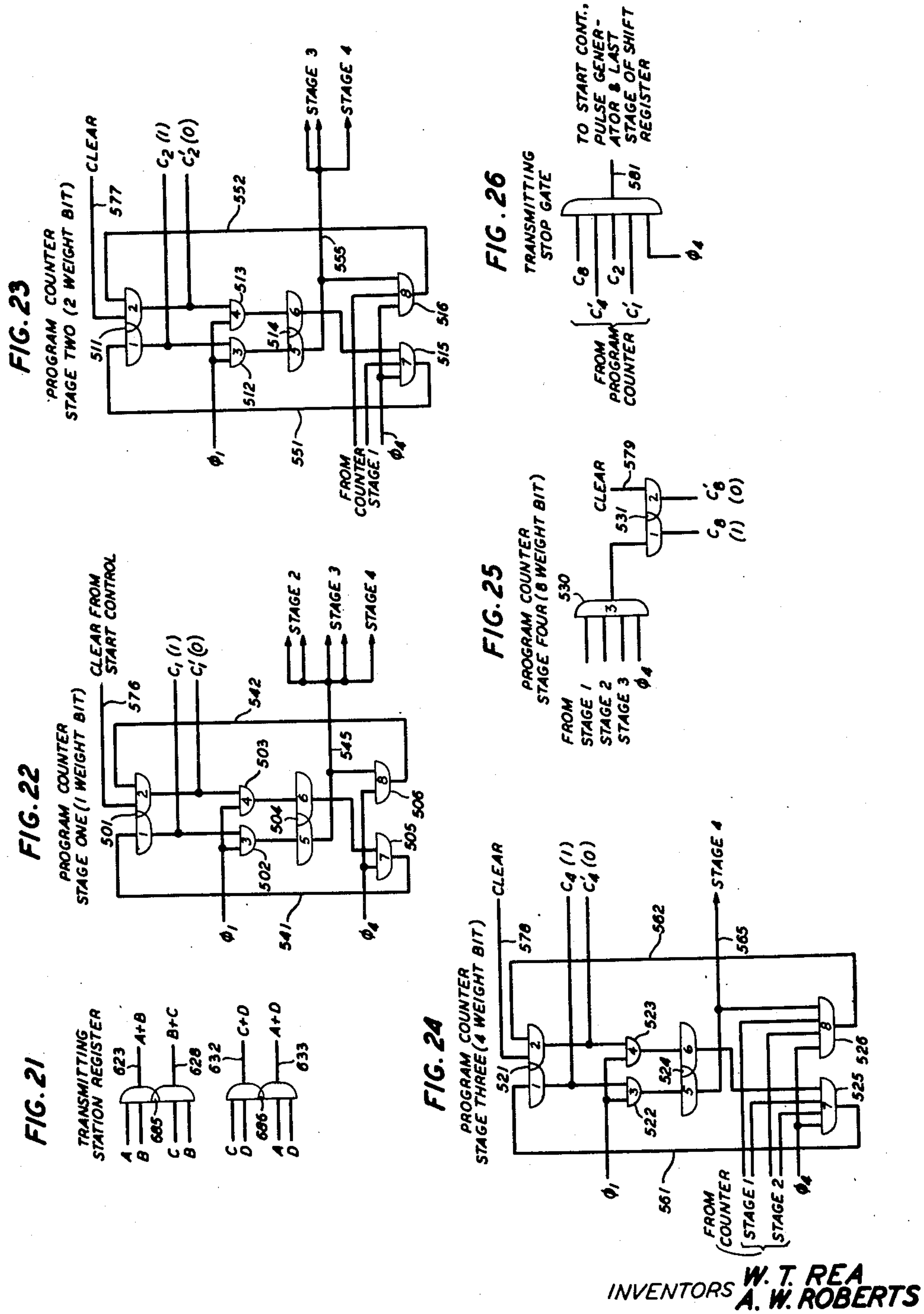
FIG. 21 shows the transmitting station register.
FIG. 22 shows stage one of the program counter.
FIG. 23 shows stage two of the program counter.
FIG. 24 shows stage three of the program counter.
FIG. 25 shows stage four of the program counter.
FIG. 26 shows the transmitting stop gate.

It is shown in FIG. 5 and its components in FIG. 25. Stage 4 of the counter is the final stage. It is not required to exercise control over a succeeding stage and therefore requires but one rank. Transistor 3 in stage 4 is a logic unit 530 which controls the single flip-flop counter 531 comprising transistors 1 and 2.

Reference to Table 1, and particularly to the binary and decimal numbers from 0 through 11, therein, will aid in understanding the operation of the program counter. Counting in binary, the counter counts by changing the least significant 0 in a lower valued number to a 1 in a higher valued number and all less significant 1's in the lower valued number to 0 in the higher valued number. For instance, in counting from a binary 0000 which represents decimal 0 to binary 0001 which equals decimal 1, the right-hand 0 in the binary number for 0, which is the lower valued number, is the least significant 0. This is changed to a 1 in the higher valued number. No other change is necessary. In counting from binary 0001, which equals decimal 1, to binary 0010, which equals decimal 2, the least significant 0 for the lower valued number is in the second position from the right. Following the rule, this is changed to a 1 and the 1 in the right-hand position of the binary number corresponding to decimal 0 is changed to a 0. On the next transition from binary 0010 which equals decimal 2, to binary 0011 for decimal 3, the 0 in the right-hand position of the binary number for 2 is changed to a 1. On the transition from the binary number 0011 corresponding to decimal 3, to the binary number 0100 corresponding to decimal 4, the least significant 0 in the binary number for 3 is in the third position from the right. This is changed to a 1 and the 1's in the two right-hand places of the binary number for 3 are both changed to 0's.

In implementing the foregoing, in counting, a counter stage will change state when it contains the least significant 0 or when a 0 in a more significant position is the least significant 0. In either case all less significant stages must be in the 1 state.

Initially all stages of the counter are set to the 0 condition by the application of a pulse from the start control circuit through conductor 319 and conductors 576, 577, 578 and 579 which connect to flip-flop 501, 511, 521 and 531, respectively. Reference to component FIGS. 22, 23, 24, and 25 show that this pulse is impressed on the right-hand transistor 2 in each of these stages. In response to this transistor 2 is turned on and transistor 1 is turned off in each of stages 1, 2 and 3. With transistor 1 in each of these stages off, negative battery is connected to the base of transistor 3, which remains on until the upper flip-flop changes state in response to a phase four pulse. During this interval ground is applied by transistor 3 to the base of transistor 5. In response to the first $\phi$1 pulse from the four-phase pulse generator following the clearing pulse for the counter, a ground condition is impressed through conductor 381 which extends into FIG. 5 where it is impressed on transistor logic units 502, 503, 512, 513, 522 and 523. The $\phi$1 pulse is not impressed on stage 4 of the program counter. The $\phi$1 pulse is used to set the lower flip-flop circuits 504, 514, and 524 in counter stages 1, 2 and 3 in the same condition as the upper flip-flop circuits. Reference to FIGS. 22, 23 and 24 indicates that the $\phi$1 pulse is impressed on each of transistors 3 and 4 in these figures in parallel. Since transistor 2 in each of these stages is on, ground is being applied to the base of transistor 4 from transistor 2 when the $\phi$1 ground pulse is applied to transistor 4. Therefore transistor 4 in each stage is turned off and negative battery from transistor 4 is applied to the base of transistor 6 in each stage turning it on and turning transistor 5 off. Thus the lower rank of each of stages 1, 2 and 3 is set in the same condition as that of the upper rank. A $\phi$4 counting pulse is next applied through conductor 384 on each of transistor logic units 505, 506, 515, 516, 525, 526, and 530. This counting pulse will be applied in parallel to the bases of transistors 7 and 8 in each of stages 1, 2 and 3 and to the base of transistor 3 in stage 4. In stage 1, since transistor 6 is on, it applies ground to the base of transistor 7 therein and since ground is then applied to both conductors of transistor 7, transistor 7 will be turned off. Negative battery will therefore be applied through conductor 541 to the base of transistor 1 in flip-flop 501 in stage 1, turning transistor 1 in stage 1 on and turning transistor 2 therein off. Stages 2, 3 and 4 will not be affected by the application of the first phase 4 counting pulse for reasons to be made clear hereinafter. In stage 1 however, the first phase 4 counting pulse sets the upper rank of the stage in the 1 condition. In response to the next $\phi$1 ground pulse, both of the connections to the base of transistor 3 in logic unit 502 in stage 1 will be grounded and transistor 3 will be turned off. This in turn applies negative battery to the base of transistor 5 in flip-flop 504 in stage 1, turning transistor 5 on and turning transistor 6 off. With transistor 5 on, ground is applied to the base of transistor 8 in stage 1. In response to the following $\phi 4$ ground pulse, transistor 8 will be turned off and a negative battery condition will be applied through conductor 542 to the base of transistor 2, turning transistor 2 on and turning transistor 1 off, to register the 0 condition again in stage 1 of the counter. Stage 1 will go through this cycle again in response to the application of every two successive phase four pulses representing two successive counts following two phase one pulses. The manner in which the succeeding stages of the counter are responsively controlled from stage 1 will now be described.

It will be remembered that, in response to the clearing pulse, all stages of the counter were set in the 0 condition, in which condition transistor 2 in each stage is on and transistor 1 is off. In response to the first following $\phi 1$ pulse, this 0 condition was set into the lower rank in each of stages 1, 2 and 3 of the counter. In this condition transistor 6 is turned on and transistor 5 is turned off. Therefore the output of transistor 5 is negative battery and of transistor 6 is ground in each of stages 1, 2 and 3 while each of these stages is in the 0 condition and the outputs are reversed for the 1 condition in each stage. Each time the output of transistor 5 in any stage is negative battery, which is during the 0 counting condition in any state, transistors 7 and 8 in each higher valued stage will be turned on. This results in the application of ground to transistors 1 and 2 in the flip-flop in the same stage, the condition of which can be changed only by the application of negative battery.

The means by which the count in a lower valued stage of the counter is passed to a succeeding stage is by the connection of ground from the output of transistor 5 in a lower valued stage to the inputs of transistors 7 or 8 in a higher valued stage and to the input of transistor 3 in stage 4. Attention is particularly called to the fact that the output of each transistor 5 in each lower valued stage is connected in parallel to the input of every transistor 7 and 8 in each higher valued stage, except in the final stage, where the connection is from each transistor 5 in each lower valued stage to transistor 3 in the final stage. A ground on the output of transistor 5 is one condition necessary to step a succeeding stage of the counter to a higher count. There will be a ground on the output of transistor 5 in any stage only when the lower rank of that stage is in the 1 condition. When the lower rank of stage 1 is in the 1 condition, ground will be applied to the bases of transistors 7 and 8 in stage 2. After being cleared, and after the application of the first phase one pulse, ground is being applied to the base of transistor 7 from the output of transistor 6 in stage 2, as transistor 6 is on for the 0 condition. Therefore, when stage 2 is in the 0 condition and the lower rank of stage 1 is in the 1 condition and a phase four ground pulse is applied simultaneously to the base of transistor 7 in stage 2, all three inputs to transistor 7 in stage 2 will be grounded and transistor 7 will be turned off. This applies negative battery through conductor 551 to the base of transistor 1 in stage 2 turning it on. This changes the upper rank in stage 2 from the 0 to the 1 condition. Simultaneously stage one of the counter is changed to the 0 condition for reasons which should be understood from the foregoing.

It will be remembered that the all 0's condition of the counter corresponds to the first signal time unit and that the first phase four pulse changes the first stage of the counter to the 1 condition and sets the four stages in the 0001 or decimal 1 condition just before the start of the second time interval. Stage 2 of the counter is set to its 1 condition in response to the second phase four counting pulse, just before the beginning of the third time interval. The four stages of the counter will then read 0010. In response to the third phase four counting pulse, just before the beginning of the fourth time interval, the upper rank of stage 1 of the counter will be set again to the 1 condition. When this phase four pulse is applied simultaneously to the connected transistors in the higher valued stages, transistor 5 in stage 1, as explained, will be applying negative battery to the base of each such transistor, and each such transistor in the higher valued stages will be turned on. The output of each will therefore be ground. So all will be applying ground to the bases of their respective transistors in the upper rank of the same stage to which they are connected. There can be no increase in count in the higher valued stages of the counter in response to this as it requires negative battery from the output of transistor 7 or 8 to change the condition of the upper rank in the same stage to effect a count. The upper rank of stage 1 only will be set in the one condition in response to the third phase four counting pulse and stage 2 will remain in the 1 condition. Stages 3 and 4 also will each remain in the 0 condition because transistor 5 in each lower stage will be applying negative battery to transistors 7 and 8 in stage 3 and to transistor 3 in stage 4. So the four stages of the register will be in the 0011 condition corresponding to a binary count of 3 during time interval 4. Just before the end of time interval four, a phase four pulse will be applied to the bases of transistors 7 and 8 in each stage and to the base of transistor 3 in stage 4 of the counter. With stage 1 in the 1 condition, transistor 5 therein is applying ground to the base of transistor 8 therein. When a phase four pulse is also applied to the base of transistor 8 in stage 1 it is turned off and transistor 2 in stage 1 is turned on to set the upper rank in stage 1 in the 0 condition. When stage 1 was in the 1 condition just before the end of the fourth time interval, transistor 5 therein applied ground to the bases of transistors 7 and 8 in stage 2. With stage 2 in the 1 condition transistor 5 therein applied ground to the base of transistor 8 therein so, in response to the grounded phase four pulse, at the end of the fourth time interval, transistor 8 in stage 2 was turned off. This in turn applied negative battery to the base of transistor 2 in stage 2 turning it on. This sets the upper rank of stage 2 in the 0 condition. When stage 2 was in the 1 condition, transistor 5 therein was turned on, applying ground from its output to the bases of transistors 7 and 8 in stage 3. At this time the lower rank of stage 3 is in the 0 condition, and transistor 6 therein is applying ground to the base of transistor 7. When the fourth phase four pulse is applied to the base of transistor 7 in stage 3, transistor 7 will be turned off, in turn turning on transistor 1 in stage 3 to set it in the 1 condition. Stage 4 of the counter cannot change condition at this time as it is receiving negative battery on its base from transistor 5 of stage 3. The condition of the four stages of the counter corresponds to 0100, equivalent to decimal 4, while counting the fifth time interval for reasons explained.

Some one or more of the lower ranks of the first three stages of the counter will be in the 0 condition on each transition starting at 0000 for decimal 0, until the transition from binary count seven, 0111, to binary count eight, 1000. As a result of this the base of transistor 3 in stage 4 will have negative battery applied thereto from the output of transistor 5 in a corresponding one or more of these stages, on each earlier transition. On this particular transition, however, ground is applied to the base of transistor 3 in stage 4 from the output of transistor 5 in each of stages 1, 2, and 3. When the phase four ground pulse is applied simultaneously, transistor 3 in stage 4 is turned off, negative battery is applied to the base of transistor 1 in stage 4 and stage 4 is changed from the 0 to the 1 condition in which transistor 1 is on and transistor 2 is off. There is no further transition of stage 4 of the counter in counting eleven time intervals and it remains in this condition with transistor 1 on and transistor 2 off till the end of the counting cycle and until it is returned to the 0 condition in response to the clearing pulse. The manner in which the counter operates on each of the other transitions should be understood from the foregoing.

*Station Register*

Refer now to the station register shown at the lower left in FIG. 6 and to its components shown in FIG. 21, This circuit comprises two flip-flop circuits 685 and 686. These are set to establish the selection of the individual one of the four stations which is to receive the message. The station register is set at the beginning of the message cycle and remains fixed during the entire message cycle.

Referring to FIG. 21, each of flip-flops 685 and 686 is set to the 0 or 1 condition by the application of negative battery to the base of its upper or lower transistor element respectively. If negative battery is applied to the base of the upper transistor in flip-flop 685 through either conductor A or B the output is ground applied to conductor 623. If negative battery is impressed on the base of the lower transistor of flip-flop 685 through conductors C or B the output on conductor 628 is ground.

Negative battery on conductor C or D to the base of the upper transistor of flip-flop 686 affords ground on conductor 632. Negative battery on conductor A or D to the base of the lower transistor of flip-flop 686 provides ground on conductor 633.

The upper transistor of flip-flop 685 controls the parity selector in cooperation with the one's counter, to encode the first character with odd parity for the partial selection of station A or station B.

The upper transistor in flip-flop 686, in cooperation with the one's counter, controls the parity selector to encode the first character with even parity for the partial selection of stations C or D.

The lower transistor of flip-flop 685, in cooperation with the one's counter, controls the parity selector so as to encode the second character for station B with even parity and the second character for station C with odd parity to complete the selection of stations B and C. This, and the function described in the next succeeding paragraph, may initially appear incongruous, but both will be explained in detail hereinafter.

The lower transistor of flip-flop 686 controls the parity selector, in cooperation with the one's counter, so as to encode the second character for station A with odd parity and the second character for station D with even parity so as to complete the selection of stations A and D.

*Parity Selector*

Refer now to the parity selector shown at the left in FIG. 6 and to its components shown in FIG. 20. The parity selector comprises eight transistors, transistors 1 through 8 arranged to form eight transistor logic units which units are formed into two gates, which are employed to insert either a 0 condition or a 1 condition in the right-hand flip-flop of stage 8 of the shift-register. The eight logic units in each figure are numbered 601 through 608. Transistors 605 through 608 each connects to the program counter and to the station register. Logic units 601, 603, 605 and 606 are formed into one gate and logic units 602, 604, 607 and 608 are formed into another gate.

Units 605 and 607 are controlled by the counter in such manner that they are each turned off during the fourth time interval and units 606 and 608 are controlled by the program counter in such manner that they are each turned off during the ninth time interval. As explained in the foregoing during the fourth time interval the counter will have counted to three. Expressed in binary notation this is 0011. Each of the four stages of the counter must apply ground for this condition. For this count the first and second stages of the counter will be in the 1 condition and the third and fourth stages will be in the 0 condition. For the 1 condition of stage one, ground will be applied to conductor C1 in FIG. 22 and this will connect in FIG. 20 through conductor C1 to the base of transistor 1. Stage 2 of the counter, shown in FIG. 23, will have ground conencted to conductor C2 for the 1 condition and this will connect in FIG. 20 through conductor C2 to the base of transistor 1. For the 0 condition of stage 3 ground will be connected to conductor C'4 in FIG. 24 and this will connect in FIG. 20 through conductor C'4 to the base of transistor 1. For the 0 condition in stage 4 ground will be connected to conductor C'8 in FIG. 25 and this will connect in FIG. 20 through conductor C'8 to transistor 1. Since logic units 605 and 607 are both to be turned off at the same time the connections described for logic unit 605 to the program counter will be connected in parallel to the base of transistor 607. Since, as explained, conductor 623 and conductor 632 each have ground applied thereto throughout the whole period of transmission of the signal train, transistors 605 and 607 will have ground applied to all of their inputs during time interval four and each will be therefore turned off during this interval.

Logic units 606 and 608 are required to be turned off during the ninth signal interval at which time the program counter will have reached count 8, which expressed in binary notation is 1000. For this condition stages 1, 2 and 3 of the program counter are in the 0 condition and the fourth stage is in the 1 condition. Connections would ordinarily be made from each of stages 1, 2 and 3 in parallel over conductor C'1, C'2 and C'4 and from stage 4 over conductor C8 in parallel through correspondingly designated conductors to the bases of transistors 2 and 4, respectively. However, as will be made clear hereinafter connections to conductors C'1, C'2 and C8 uniquely define this count and no connection to stage 3 is required. As a result of the foregoing transistors 2 and 4 will be both turnesd off during signal interval 9. When transistor 1 is turned off it applies negative battery to the base of transistor 5 in logic unit 603. This in turn applies ground to the base of transistor 7 in logic unit 601.

It will be remembered that stations A and B are each arranged so that it is partially selected in response to odd parity applied to the first character. Under such circumstances, if the count of the 1's counter is even, it is necessary to add a 1 signal element to the first character so as to have an odd total of 1's therein. The one's counter, as shown in FIG. 18, is arranged to apply ground through conductor 652 to the base of transistor 7 in logic unit 601 in the parity selector, FIG. 20, when the one's counter has counted an even number of 1's. In response to a phase three ground signal, all three connections to the base of transistor 7 will be ground. Under these conditions ground will be applied through conductor 660 to the base of transistor 5 in logic unit 416 in stage 8 of the shift register, as shown in FIG. 16, to insert a 1 condition as a parity checking element in flip-flop 416. In response to this the 1 condition will later be transferred to the ninth stage of the shift register as explained in the foregoing. If the count attained in the 1's counter in response to the counting of the 1's among the four signal elements of the first character had been odd, negative battery would have applied through conductor 652 to the base of transistor 7 in logic unit 601. This would have turned on transistor 7 and applied ground to conductor 660. As a result of this, transisttor 5 in logic unit 416 in stage 8 of the shift register would not have been turned on at this count and a 0 would be added to the first character as the parity checking element.

If station C or D were to have been partially selected by the parity element added to the first character, all of the connections to the base of transistor 3 in logic unit 607 would have been grounded. Negative battery would be applied to the base of transistor 6 in logic unit 604 which would apply ground to the base of transistor 8. If the number of 1's counted among the first four signal elements of the first character were odd, ground would be applied through conductor 651 which extends from the 1's counter, FIG. 18, to the base of transistor 8 in logic unit 602 in the parity selector. When a grounded phase 3 pulse was also applied to this transistor, all three inputs thereto would be ground and negative battery would be supplied through conductor 661 to stage 8 of the shift register. This would insert a 1 condition signal element therein so as to make the total number of 1's in the first character even to partially select stations C and D.

If the one's counter is in the even condition after having counted the number of 1's in the four signal elements of the first character, negative battery would be applied to conductor 651. This would apply ground to conductor 661 to stage 8 of the shift register. As a result of this, a 0 signal condition would be inserted as the parity signal element to maintain the number of 1's in the first character even.

To complete the selection of station A, the second character must have odd parity. For this condition ground is applied, as explained, through conductor 633 to the base of transistor 4 in logic unit 608. When the program counter attains the binary count of 8, all connections to the base of transistor 4 in logic unit 608 will be grounded. Negative battery will be applied to transistor 6 in unit 604 grounding the base of transistor 8 in unit 602.

At this point reference is made to Table 3 which tabulates the logic conditions built into the circuit.

It is pointed out particularly that the 1's counter starts counting the 1's at the beginning of a signal train and continues to count 1's in an entire train without interruption.

During the counting it cooperates to add the proper parity element to the first character, but it does not stop counting and recycle at this point. It includes in its count and 1 condition parity signal element which may be added as required to the first character.

With respect to the parity signal element for the second character for station A, when the 1's counter has counted the first nine signal elements, if the state of the 1's counter is 0, indicating that it has counted a total number of 1's which is even, since the first character including the parity element for station A had an odd number of 1's, the number of 1's in the four elements of the second character must be odd. Therefore, for this condition a 0 signal element is required to be added to the four elements of the second character as a parity checking element to maintain the odd parity condition of the second character.

In selecting station A, if the total number of 1's among the first nine signal elements is even, negative battery will be impressed on conductor 651 and a 0 will be added as the parity checking element for the second character. This will meet the requirement that the second character has odd parity for the total number of 1's in the second character is odd.

If the 1's counter is in the 1 condition after having counted all of the 1's among the first nine elements, since the first character for station A had an odd number of 1's among the first five elements, there must be an even number of 1's among the succeeding four signal elements to make the total of 1's among the nine elements odd. Therefore to provide odd parity for the second character a 1 condition signal element is required to be added to the train. For this condition conductor 651 is grounded. This results in the addition of a 1 signal element as a parity signal element for the second character.

For station B, the first character has odd parity the second character has even parity. For the B station second character, after the program counter counts to 9 if the one's counter is in the 0 or even condition, since the first five elements had a total number of 1's which is odd, the total number of 1's in the next four elements must be odd to make all 9 even, so a 1 condition signal element must be added as a parity element to make the number of 1's in the second character even. Transistor 2 in unit 606 is turned off at count 9, transistor 5 in unit 603 is turned on, grounding transistor 7 in unit 601. If the one's counter is even, lead 652 is grounded turning transistor 7 off and putting a 1 into the eighth stage of the register to make the one's in the second character even. If the one's counter is odd, negative battery will be connected to conductor 652, turning transistor 7 on. The 0 condition in the eighth stage of the register will be undisturbed.

For selection of station C, the parity of the first character is even and of the second character is odd. After the 1's in the first character have been counted, if the number of 1's is even, conductor 651 will have negative battery applied thereto. The output of transistor 8 through conductor 661 will be ground. The state of shift register stage 8 will therefore remain unchanged and a 0 condition will be read into stage 9 as the parity element.

In selecting station C, if the one's counter is in the 1 condition after counting the 1's in the first character, ground will be applied to conductor 651 and the output through conductor 661 will be negative battery changing the eighth stage of the register to the 1 condition to make the 1's in the first character even.

In selecting station C, if the state of the 1's counter after counting the 1's in the first 9 elements is 0, or even, since the number of 1's in the first character are even, the number of 1's in the first four elements of the second character must also be even. So to make the number of 1's in the second character odd, as required, it is necessary to produce a 1. With the one's counter in the 0 condition, ground is applied to conductor 652 and negative battery to conductor 660 to insert a 1 condition in the eighth stage of the shift register.

For the selection of station C, if after counting the 1's in the first 9 elements the state of the one's counter is odd, or 1, since there were an even number of 1's among the first five elements, there must have been an odd number of 1's among the succeeding four elements. To make the total number of 1's in the second character, including the parity element, odd, as required, it is necessary to produce a 0. When the program counter is odd, at program count 9, conductor 652 will have negative battery applied thereto. Ground will therefore be supplied over conductor 660 to maintain the 0 condition in the eighth stage of the register to supply odd parity to the second character for the selection of station C.

For selection of station D, even parity is supplied to each of the two characters. If after counting the first four elements the state of the one's counter is 0, or even, it is necessary to maintain the 0 condition in the eighth stage of the shift register. For an even condition of the one's counter, conductor 651 has negative battery applied thereto and conductor 661 has ground applied thereto which leaves the 0 condition in the eighth stage of the shift register as the parity element of the first character.

For the selection of station D, if after counting 9 the one's counter is in the 0, or even, condition, since the number of 1's in the first five elements was even, the number of 1's in the next four elements must also have been even. Therefore there will be negative battery on conductor 651 and ground on conductor 661 to maintain the 0 condition in stage 8 of the shift register.

For the selection of station D, if the state of the one's counter after counting the first four elements is odd, ground will be applied to conductor 651 and negative battery to conductor 661 to insert another 1 condition signal element in stage 8 of the shift register to make the number of one's in the first character plus the parity signal element even.

For the selection of station D, if the state of the one's counter after counting the first 9 elements is 1, or odd, since the number of 1's in the first five elements was even, there must have been an odd number of 1's among the succeeding four elements. Since it is required that the second character have even parity, it is necessary to add a 1 condition signal element to the second character. For the one condition at count 9 conductor 651 will be grounded and conductor 661 will have negative battery applied thereto to insert a 1 condition signal element in the eighth stage of the shift register.

The foregoing conditions are tabulated in Table 3. The left-hand column indicates the stations A, B, C and D. The next column shows the parity conditions that are required to be applied to the first and second character to select the indicated station. The next column shows the state of the one's counter and it applies to the condition of the counter after counting 4 and after counting 9. For instance, referring to the condition for station A if the state of the 1's counter is 0 after counting 4, the table shows that a 1 must be added to the first character to provide odd parity as required for station A. Reference to the top line also indicates, that if the state of the one's counter is 0 after counting 9 signal elements the parity element for the second character is 0.

Still referring to station A the table shows that if the condition of the one's counter is 1, or odd, after counting the first four elements the parity element is a 0. And it shows that if after counting 9 elements the condition of the counter is odd the parity element added to the second character is a 1 condition signal element.

Table 3 shows also the condition of the signal element required to be added for the overall parity bit when the counter has counted to the 0 condition or the 1 condition on trains directed to each of stations A, B, C and D. It will be recalled that it was decided to add a final parity element to the whole train, making eleven elements in the train, to prevent the acceptance, by some station of a train having an error. This was called an overall parity check. It was agreed that the eleventh element would be a 0 or a 1 condition element to make the total number of 1's in the eleven element train odd. This, of course, played no part in station selection. The right-hand column in FIG. 3 indicates that a 1 condition signal element is added to each train if, after counting the first ten elements, the condition of the one's counter is 0, or even, and that a 0 condition signal element is added if, after counting the first ten elements in the train, the condition of the 1's counter is 1. This is the same for a train directed to any one of stations A, B, C and D as shown by the table. How this is done may be understood from reference to the overal parity counter in FIG. 6 and to the components as shown in FIG. 19.

*Overall Parity Gate*

Refer now to FIGS. 6 and 19, which show the overall parity gate. When the one's counter has counted the number of 1's among the first ten signal elements of a train the program counter will have counted 9, or 1001, in binary for reasons explained. The binary counter will apply ground through the C1 conductor of stage one of the counter, FIG. 22, through the C'2 conductor of stage 2, FIG. 23, through the C'4 conductor of stage 3, FIG. 24, and through the C8 conductor of stage 4, FIG. 25, to the base of the overall parity gate or transistor logic unit 609, FIGS. 6 and 19.

If the one's counter has counted an even number of one's ground will be applied to conductor 650. When a phase three ground pulse is applied through conductor 383 to the base of unit 609 it will be turned off and negative battery will be applied through conductor 662 to insert a 1 condition element in the eighth stage of the register to make the number of 1's in the eleven-element train odd.

If the one's counter has counted an odd number of 1's, negative battery will be applied to conductor 650, conductor 662 will be grounded, and the 0 condition in which stage 8 has been set will remain undisturbed to maintain the odd number of 1's in the train.

*Stop Gate*

At the end of the message, that is, at the end of the eleventh time interval, it is necessary to stop the operation of the control circuits and to clear the last stage of the shift register. This is performed in response to the phase 4 ground pulse during the eleventh time interval. At this time the program counter will have counted to 10 which, in binary notation is 1010. The first, second, third and fourth stages of the binary counter applies ground through conductors C'1, C2, C'4 and C8, respectively. When the phase four ground is applied, negative battery is impressed through conductor 581 and 582 to the four phase pulse generator 317 and to the start control circuit 300, both in FIG. 3. Negative battery is applied also through conductors 581 and 583 to the base of transistor 4 in flip-flop 419, as shown in FIGS. 4 and 17, to set the ninth stage of the shift register in the 0 condition. This restores the transmitter to normal, ready for the transmission of the following train.

*Detailed Description of Receiver*

Figure 7:
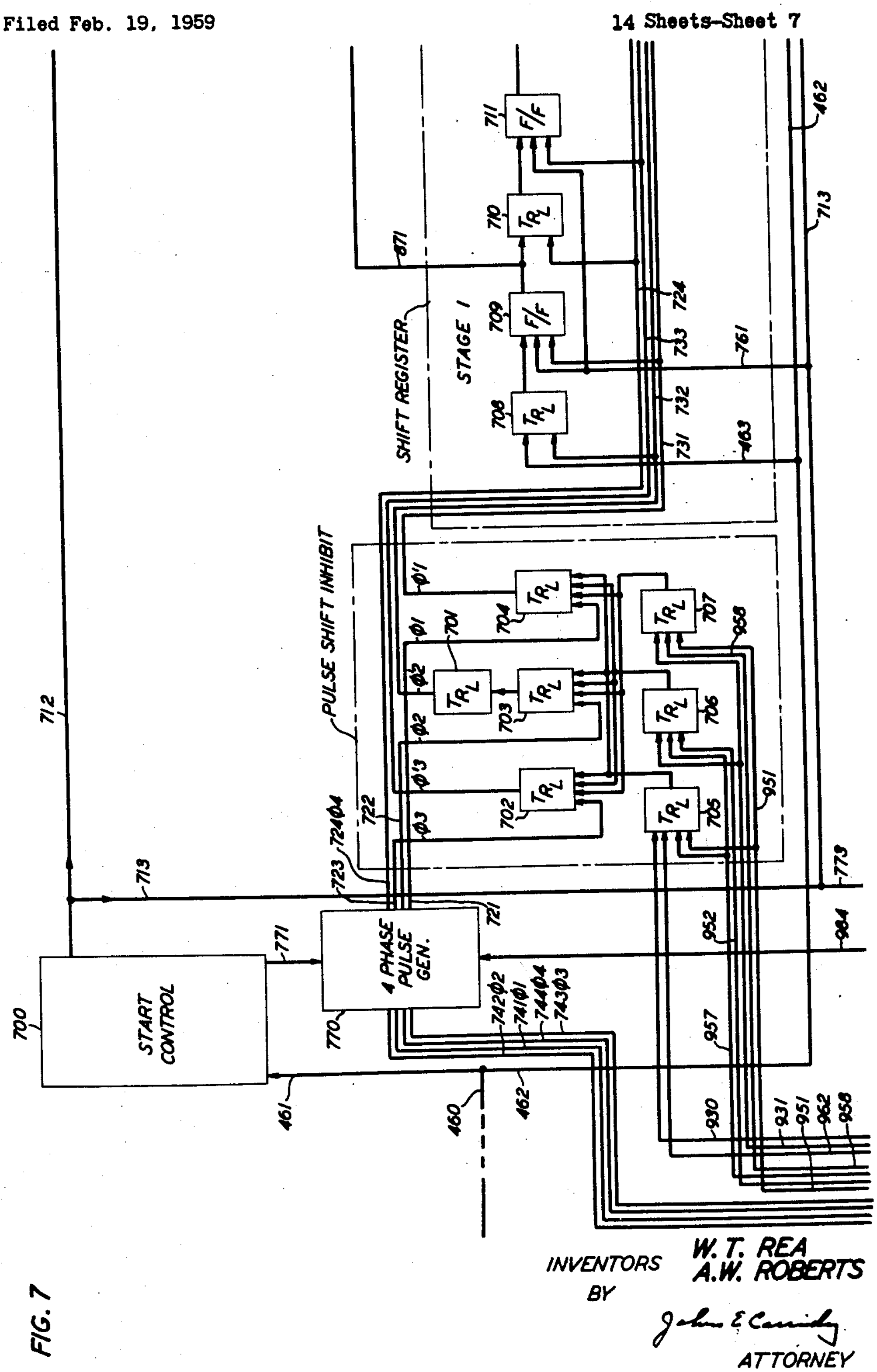
Figure 8:
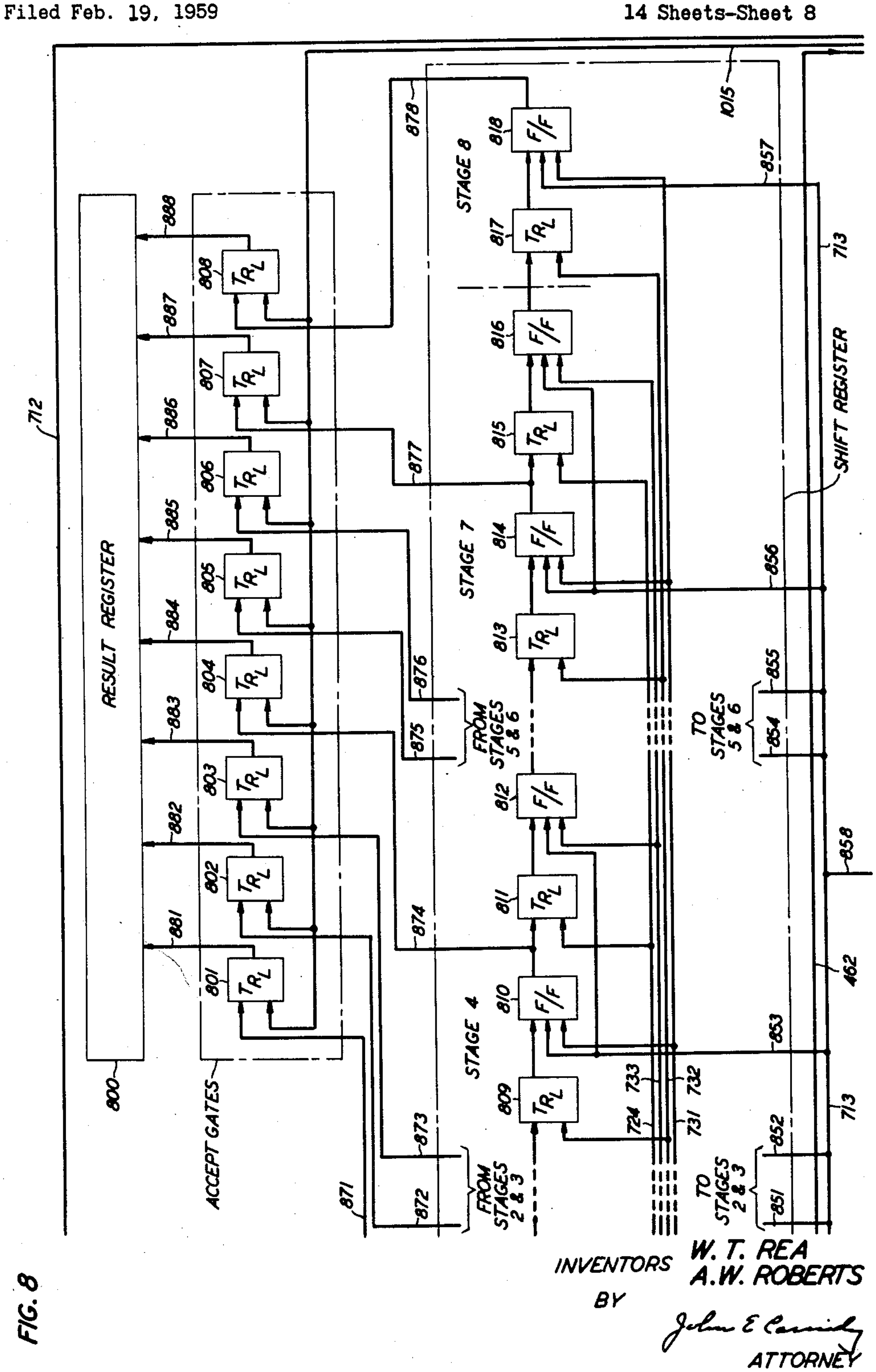
Figure 9:
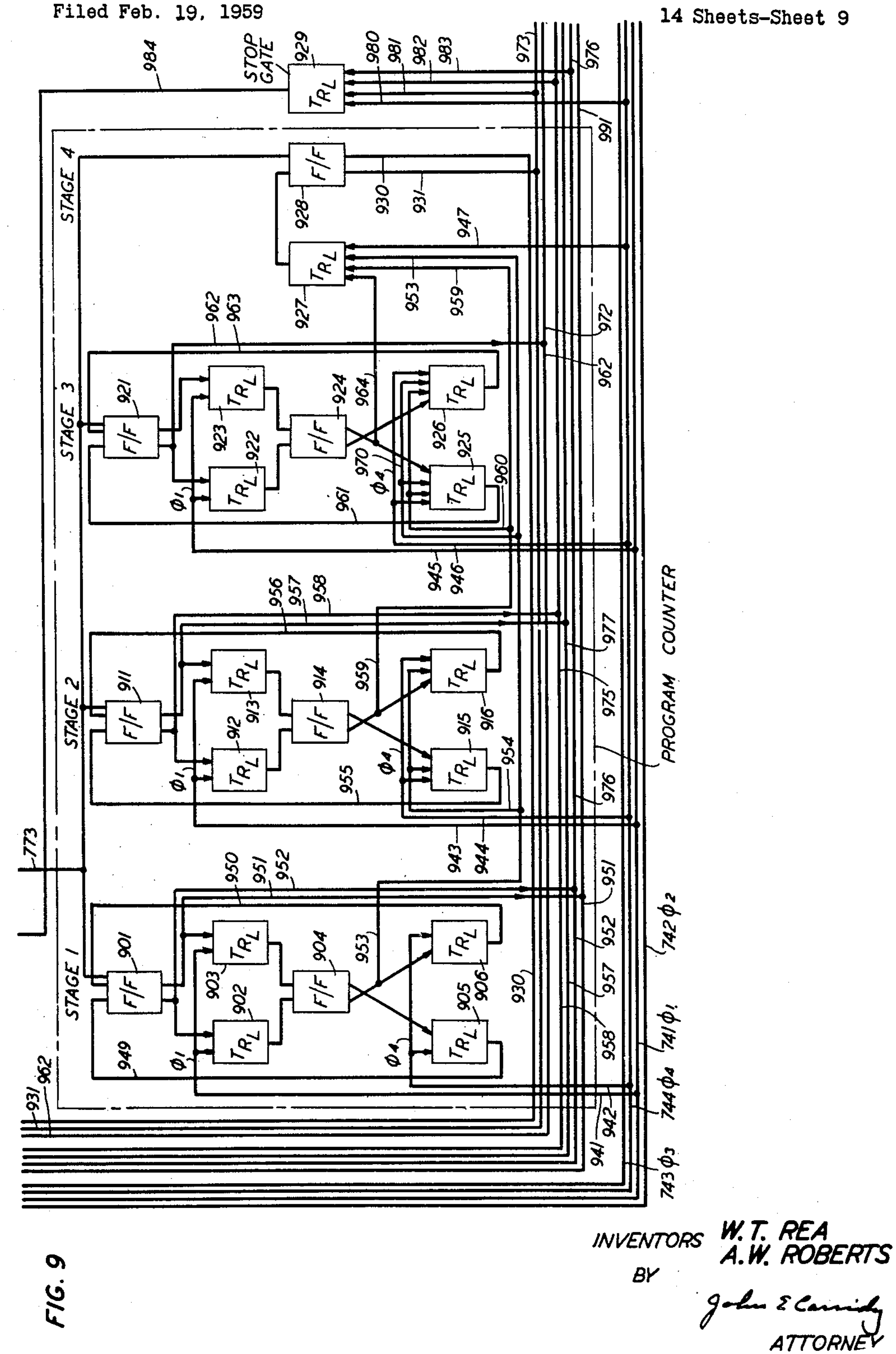

Refer now to FIGS. 7, 8, 9, and 10 which show the receiver when disposed as shown in FIG. 11. The start control 700 is shown at the upper left in FIG. 7 and below there is shown the four-phase pulse generator 770. These two circuits are the same as the corresponding circuits in the transmitter. To the right of the four-phase pulse generator is shown the shift inhibit circuit; this is a new circuit individual to the receiver which will be described in detail hereinafter. And at the far right in FIG. 7 and across the lower portion of FIG. 8 the shift register is shown. The shift register, except for minor differences to be described hereinafter, is the same as the shift register in the transmitter. Attention is called to the fact, however, that in the receiver, only eight stages are required, as contrasted with the nine stages required in the shift register of the transmitter. The reason for this is that no stage corresponding to stage 5 in the transmitting shift register, which was reserved therein for the parity checking element applied to the first character, is required in the receiving shift register, as will be made clear hereinafter. Only the four elements of each of the two characters are read into the shift register in the receiver and therefore a total of eight shift register stages only is required. Above the shift register in FIG. 8, the accept gates circuit, which consist of eight transistor logic units 801 to 808, is shown. This is a new circuit individual to the receiver and will be described hereinafter. Above the accept gates is shown the result register 800. In FIG. 9 a four-stage program counter identical with the program counter in the transmitter is shown. At the extreme right in FIG. 9 the stop gate 929 is shown. The stop gate will be described in detail hereinafter. The gate logic unit is shown at the left in FIG. 10. The gate logic unit is a new circuit individual to the receiver and will be described in detail hereinafter. The 1's counter is shown at the right in FIG. 10. The 1's counter is identical with the 1's counter described in the transmitter.

The start control circuit starts the four-phase pulse generator by applying a condition through conductor 771. The start control circuit also applies a clearing pulse through conductors 713 and 773 to clear the flip-flop circuits 901, 911, 921 and 928 in the four stages of the program counter. The start control circuit also applies negative battery through conductor 712 and conductors 1020 and 1021 in parallel to flip-flop 1007 and 1010 respectively in the 1's counter to set the 1's counter in the 0 condition prior to the start of counting the 1 condition signal elements in the received train. The program counter after being cleared operates in the same manner as described for the program counter in the transmitter.

As in the transmitter the binary count is one less than the actual numerical count of the signal interval being received.

The signals incoming from the transmitter are received through conductor 460 and applied through conductor 461 to start the start control circuit. The incoming signals are also applied through conductors 462 and 463 to transistor logic circuit 708 in stage 1 of the shift register. Attention is called to the fact that, in the transmitter, the four signal permutations for the two characters were read simultaneously through the input gates to individual stages in the shift register simultaneously by parallel read in. In the case of the receiver, however, the incoming signal elements are applied one signal element at a time to transistor logical unit 708 in stage 1 of the register and then are moved progressively, during each four phase signal time unit, to succeeding stages of the register. As mentioned in the foregoing the parity signal element following the first character, which element is the fifth element in the train, is not read into the register. In order to achieve this the transfer process by means of which the signal elements are moved successively from stage to stage is stopped for one entire signal time unit. After that the transfer process is restarted while the four elements comprising the second character are read into the register. At the end of the ninth time unit the eight signal elements comprising the two characters will repose in the register. At this time transfer is again inhibited while the tenth signal element, which is the parity element for the second character, and the eleventh signal element, which is the overall parity element, are received. Each incoming signal element in addition to being applied to transistor logic unit 708 is also impressed through conductor 462 on transistor logic unit 1014 in the 1's counter. The 1's counter counts the 1's in the entire train of eleven signal elements. It functions in the same manner as described for the 1's counter in the transmitter.

*Receiving Shift Register*

Figures 27, 28, 29, 30, 31, 32:
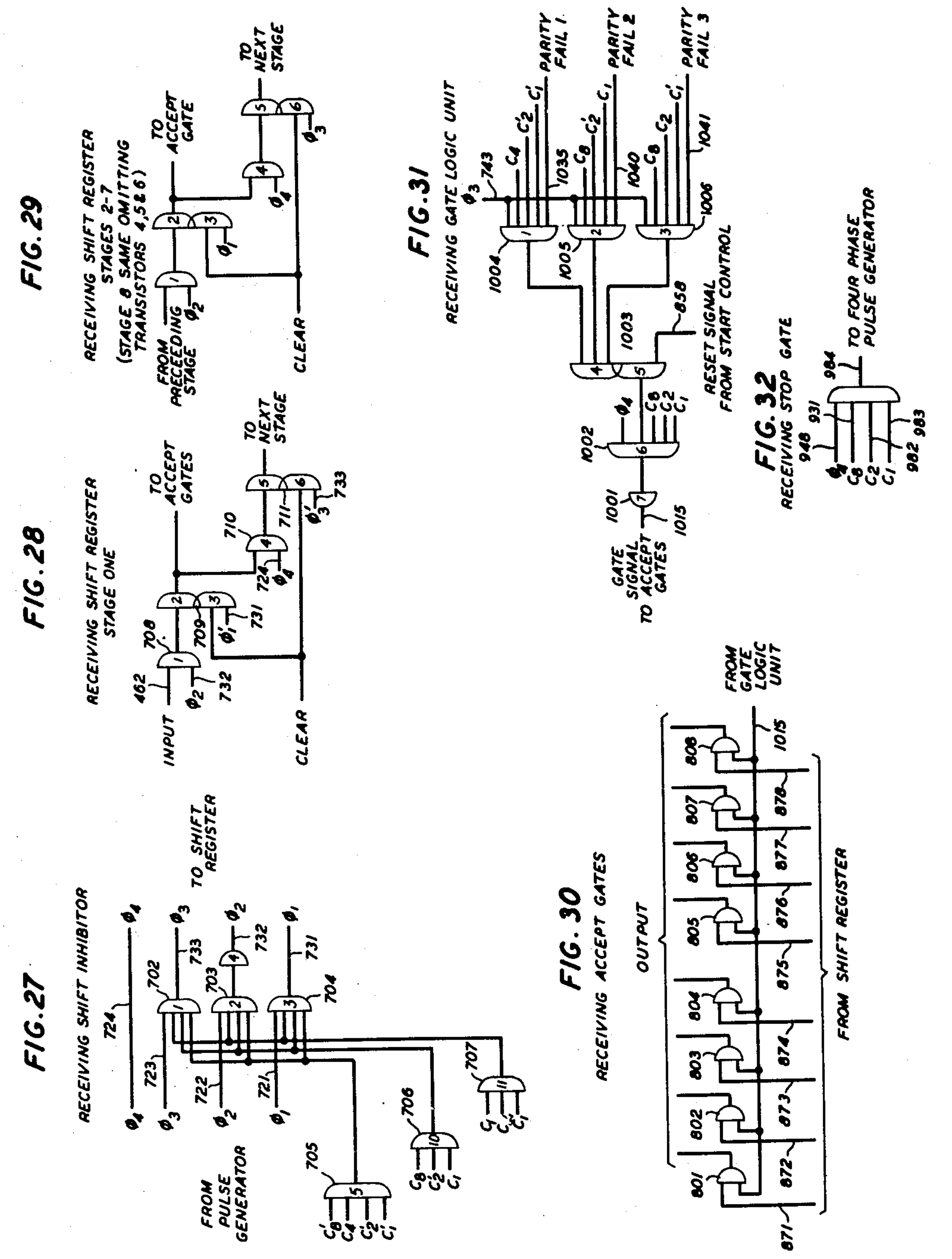
FIG. 27 shows the shift-inhibit circuit for the receiving shift register.
FIG. 28 shows stage one of the receiver shift register.
FIG. 29 shows stages two to seven, inclusive, of the receiving shift register.
FIG. 30 shows the accept gates of the receiver.
FIG. 31 shows the receiver gate logic unit.
FIG. 32 shows the stop gate.

The receiving shift-register is an eight-stage double-rank shift register except for the eighth stage which has but one rank. The components of the input stage of the register, stage 1, are shown in FIG. 28. The components of the general stages, stages 2 through 7, are shown in FIG. 29. The eighth and last stage of the register is shown in FIG. 8 only, as it is considered that a figure showing the components is not necessary to an understanding of the invention. Stages 2, 3, 5 and 6 are not shown in FIG. 8 to simplify the drawing.

Stages 1 through 7 of the shift register are generally similar to their counterparts in the transmitter with three exceptions, first, the pulses from the four-phase pulse generator are applied to different units in the receiver shift register stages from those to which they are applied in the transmitter. Second, no provision is made for parallel read-in of the permutations of the two characters, as none is required. Third, the contents of the stages are read-out in parallel. The eight stages of the receiving shift register are first cleared before the reception of each train by the application of a clearing pulse from the start control circuit 700, through conductor 713, which connects in parallel, to a conductor such as conductor 761, 853, 856 or 857 in each stage. These connect to transistors 3 and 6 in each. In the receiving shift register, all of the elements of each train are first impressed in succession on stage 1 and are then shifted from stage to stage of the register in sequence, one stage for each signal unit time interval.

As shown in FIG. 7, stage 1 of the receiving shift register comprises logic units 708 and 710 and flip-flops 709 and 711, which are arranged as shown in FIG. 28 and in FIG. 8. Stages 2, 3, 5 and 6 which are the same as stages 4 and 7 are not shown on the overall receiver drawing. Stage 4 comprises logic units 809 and 811 and flip-flops 810 and 812. Stage 7 comprises logic units 813 and 815 and flip-flops 814 and 816 and stage 8 has one logic unit 817 and one flip-flop 818. Except for the fact that stage 1 receives the incoming signals through input conductor 462 and each of the other stages receives the signals from the preceding stage each of stages one through seven is identical with each other.

The register shifting is performed under control of $\phi'1$, $\phi2$, $\phi'3$ and $\phi4$ pulses from the four-phase pulse generator. The $\phi'1$, $\phi2$ and $\phi'3$ are supplied through the pulse shift inhibit circuit, in FIG. 7, to be described hereinafter from the four-phase pulse generator. The $\phi4$ pulse is received directly from the four-phase pulse generator for reasons to be explained hereinafter. The $\phi'1$, $\phi2$, $\phi'3$ and $\phi4$ pulses are supplied through conductors 731, 732, 733 and 724 respectively to the base of transistor 3, transistor 1, transistor 6 and transistor 4 in each of stages 1 through 7 as shown in FIGS. 28 and 29.

Omitting stage 8 for the present, the $\phi'1$ pulse clears the left-hand flip-flop in each stage. The $\phi2$ pulse gates the incoming signal element through transistor 1 in stage 1 and transfers the signal elements from stage to stage. The $\phi'3$ pulse clears the right-hand flip-flop in each stage and the $\phi4$ pulse sets the lower flip-flop in the same condition as that of the upper flip-flop.

In stage 8, the $\phi'1$ pulse clears the single flip-flop 818 and the $\phi2$ pulse gates the signal element from stage 7 into stage 8.

After the eight-signal elements of the two characters have been read into the register, if the parity checks are met, in a manner to be explained, the contents of the register are read out simultaneously through conductors 871 through 878 to the accept gates 801 through 808, in a manner to be explained.

*Receiving Pulse Shift Inhibit Circuit*

It will be recalled, from the description of the operation of the transmitting shift register, that shifting was achieved by the application of phase pulses from a four-phase pulse generator in the transmitter. The shifting in the receiving shift register is also under control of pulses from a four-phase pulse generator in the receiver. In the transmitter the application of the pulses was directly from the four-phase pulse generator to the transmitting shift register. In the receiver, the shifting is controlled so that no shifting is performed during the fifth, tenth and eleventh signal time unit interval, to delete the parity signal elements from the signal train, so as to insert in the register only the eight signal elements which form the two characters in the train. In the present arrangement this is performed by inhibiting the shift pulses during these intervals so that no shift pulses are applied to the shift register during the fifth, tenth and eleventh intervals. In order to do this the receiver is provided with a shift inhibit circuit, shown at the lower left in FIG. 7. Its components are shown in FIG. 27. The shift inhibit circuit is inserted between the output of the receiving four-phase pulse generator and the input of the receiving shift register.

Essentially the shift inhibit circuit consists of three gates through which the phase one, phase two and phase three pulses are directed on their way to the shift register. The phase four pulse is run directly from the pulse generator to the shift-register without passing through a gate, as none is required. The gates are controlled by the program counter so that they are closed to prevent the application of the shift pulses during time intervals five, ten and eleven.

Refer now to FIG. 27 which shows the components of the shift inhibitor.

The three conductors 721, 722, and 723 supply a phase one, phase two, and phase three ground pulse, respectively, from the pulse generator 770, FIG. 7, to the shift inhibitor circuit. Conductors 721, 722 and 723 connect individually to the base of transistors 3, 2, and 1, respectively. The base of transistor 705 is connected by means of an individual conductor to each of stages 1, 2, 3 and 4 of the program counter. The connection is made to the output of flip-flops 901, 911, 921 and 928 in the four stages in FIG. 9. It will be remembered that there were two output conductors, one extending from each of two transistors in the flip-flop circuit of the upper rank of each stage of the program counter. The conductor from the right-hand transistor in each of these is grounded for the 0 condition and conductor from the left-hand transistor is grounded for the 1 condition of each stage. During the fifth interval the program counter will be counting four which in binary notation is 0100. Remembering that the position in the binary number from left-to-right correspond to the numbering of the counter stages from right-to-left, it is necessary to connect the right-hand transistor in the upper flip-flops in program counter stages one, two and four, which are in the 0 condition, and the left-hand transistor in stage three, which is in the 1 condition, to the base of transistor 5 to turn it off at count 5. These connections are made as shown in FIG. 9 through conductors 951, 957, 962 and 930. This turns transistor 5 off at count 5.

For the tenth time interval, the binary count of the program counter will be nine or 1001. This requires a connection to the left-hand transistor in the upper flip-flop of stage one and to the left-hand transistor in the single flip-flop in stage four. It also requires a connection to the right-hand transistor in stage two. No connection is made to the right-hand transistor in stage 3 as it is not necessary since the connections which are made to stages 1, 2 and 4 prevent transistor 10 from being turned on at any count other than at binary count 9. The reason for this may be seen from a consideration of the binary permutations corresponding to decimals 0 through 11 in Table 1. It will be seen from this table that in counting from 0 through 11 there are but four permutations corresponding to those for decimals 8 through 11 in which the counter in stage 4 is in the 1 condition. Of these the permutations corresponding to 9 and 11 are the only ones which have a 1 in the right-hand position. Of these, the combination corresponding to decimal 9 is distinguishable from that for decimal 11 in that the combination for 9 has a 0 in the second position from the right while that for 11 has a 1 therein. In the range from decimal 0 through 11 in binary notation therefore the permutation 1–01 is unique where the symbol – in the notation indicates that the digit in this position may be omitted. The connection to stage three of the counter may therefore be omitted. Therefore ground connections from stages 1, 2 and 4 of the program counter through conductors C1, C'2 and C8 which in FIG. 9 are designated 952, 957 and 931 will turn off transistor ten during the tenth time interval.

For reasons which should be understood from the foregoing, for the eleventh time interval the binary counter will read ten or 1010 in binary notation and three connections, again, are all that are required, one to each of stages one, two and four. The connections are made through conductors C'1, C2 and C8, which in FIG. 9 are designated 951, 958 and 931, between stages one, two and four, respectively, of the counter and the base of transistor 11 in FIG. 27. Conductors 958 and 931 connect to the left-hand transistor of the upper flip-flop, which transistor is grounded for the one condition, in stages two and four, respectively, and conductor 951 connects to the right-hand transistor of the upper flip-flop in stage one which transistor is grounded for the 0 condition.

Transistors 5, 10 and 11 in FIG. 27 corresponding to logic units 705. 706 and 707 in FIG. 7 will be turned off during the fifth, tenth and eleventh signal element time interval, respectively. Each will apply negative battery during its respective interval to the base of transistors 1, 2 and 3 in parallel. During each of these intervals, therefore, transistors 1, 2 and 3 will be turned on. During all other counts by the program counter, transistors 5, 10 and 11 will be turned off by the application of negative battery to their bases from some one or more of the counter stages. When any one of transistors 5, 10 or 11 is turned on, ground will be applied to the bases of transistors 1, 2 and 3. As the hase one, phase two and phase three pulses are each ground pulses, transistors 1, 2, and 3 will each be turned off when these pulses are applied, except during signal intervals 5, 10 and 11. When transistors 1, 2 and 3 are turned off, the output from each of transistors 1 and 3 is negative battery, for that $\phi'3$ and $\phi'1$ pulses, respectively. The output of transistor 2, which is negative battery when transistor 2 is turned off, is impressed on the base of transistor 4, the output of which is ground for a $\phi2$ pulse. The conditions required from the four phase pulse generator to control the shift-register are off ground pulses during phase one and phase three and ground pulse during phase two and phase four. This will be the normal output condition during all signal intervals except during the fifth, tenth and eleventh intervals when the conditions during phase one, phase two and phase three will be reversed. When reversed the pulses are not effective to perform the shifting function for reasons which should be understood from the foregoing.

*Gate Logic Unit*

Figure 10:
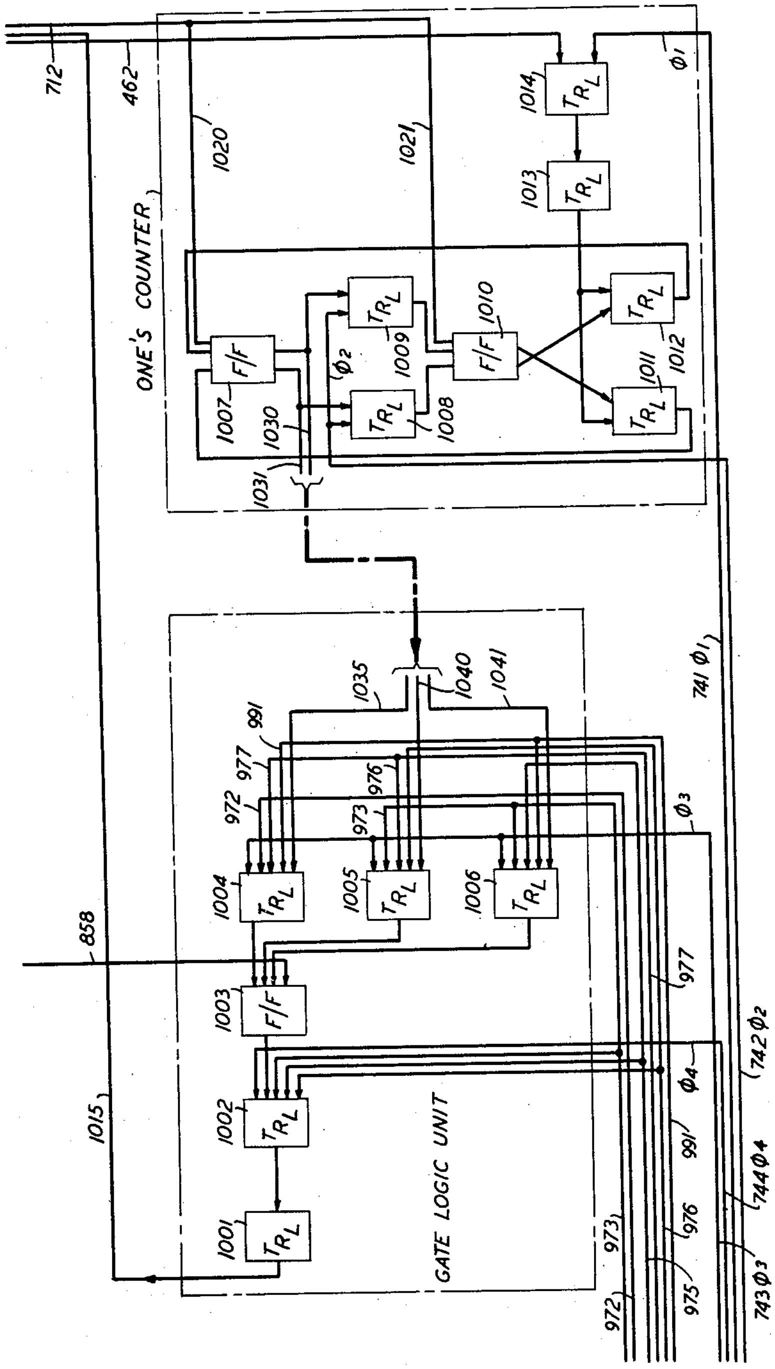

The receiver gate logic unit, shown in FIG. 10 and the components in FIG. 31, comprises three input gates which are transistor logic unit 1004, 1005 and 1006, employing transistors 1, 2 and 3, respectively, a flip-flop inhibit circuit 1003, employing transistors 4 and 5, an inhibit logic unit 1002, employing transistor 6 and an output gate which is transistor logic unit 1001 employing transistor 7. The inhibit flip-flop circuit is set at the beginning of each program by the application of negative battery from the start control circuit through conductors 713 and 858 to the base of transistor 5 turning transistor 5 on and transistor 4 off. This is the normal condition, that is, when there is no parity failure.

First considering the operation of the receiver for this condition, with transistor 5 on, ground will be applied to the base of inhibit transistor 6. However, transistor 6 is jointly controlled by the program counter and a phase four connection to the four phase pulse generator. The connections to the counter are such that negative battery will be connected to the base of transistor 6 from some one or more of the counter stages except when the program counter goes to binary count 11, or 1011, which occurs in response to the phase four pulse near the end of time interval eleven. During phase four of time interval eleven, a phase four ground pulse will be applied to the base of transistor 6 and all of the connections to the base of transistor 6 will be ground. Connections are made from stages one, two and four of the program counter through conductors C1, C2 and C8, which in FIGS. 9 and 10 are designated 976, 975 and 931, respectively, to the base of transistor 6. The phase four connection is made from pulse generator 770 through conductor 744 to the base of transistor 6. When all of these connections to the base of transistor 6 are grounded, a negative battery pulse is applied to the base of transistor 7 and a ground pulse is applied through conductor 1015 to the bases of the transistors in the receiving accept gates circuit, FIG. 8 and FIG. 30. Ordinarily negative battery is applied through conductor 1015 to the accept gates so that the output of each gate is ground except during phase four of the stated count. Then if there has been no failure of any one of the three parity checks the inhibit condition applied normally to the accept gates is removed and the contents of the receiving shift register are transferred to the result register. If there has been any parity failure, however, the negative battery inhibiting condition applied to conductor 1015 remains unchanged. The accept gates remain inhibited and the contents of the receiving shift register are not read out to the result register. How the three parity failure gates operate to inhibit the accept gates in the event of failure of any of the parity checks will now be explained.

In the receiver, FIG. 10, the one's counter is similar to the one's counter in the transmitter. It comprises six transistor logic units 1014, 1013, 1008, 1009, 1011 and 1012 and two flip-flops 1007 and 1010. The conditions representing 1's in the incoming train are impressed through transistor 1014 in the input. Responsively, in the manner described for the one's counter in the transmitter, flip-flop 1007 will be set in the 0 or the 1 condition depending upon the number of ones received. The condition of the one's counter will be sampled at counts five, ten or eleven to determine if it is odd or even. If the count is even, the output of the right-hand transistor in flip-flop 1007 and of conductor 1030 in FIG. 10 will be ground and of conductor 1031 will be negative battery. If the count is odd, the output of the left-hand transistor in flip-flop 1007 and of conductor 1031 will be ground and of conductor 1030 will be negative battery.

Conductors 1030 and 1031 interconnect to conductors 1035 and 1040 in a unique manner at each receiving station, depending upon the parity permutation assigned thereto for the first and second character, to select the station when called. The connection to conductor 1041 is the overall parity connection and is the same at each station. It is always made to conductor 1030.

First, to consider the overall parity selection, out of order, by way of introduction, for odd overall parity the counter should have counted an odd number of 1's when all eleven signal elements have been received. If this condition is met, there will be an off ground on conductor 1030, which connects to conductor 1041, which in turn connects to the base of transistor 3 in logic unit 1006. If there is a failure there will be ground placed on conductor 1030 during $\phi$1 of the eleventh time cycle. When the program counter reaches binary count 1010, corresponding to decimal count 10, which it does in response to the phase four pulse of the tenth time interval, three of the inputs to the base of transistor 3 in logic unit 1006 will be ground. When a phase three ground pulse of the eleventh cycle is applied from the pulse generator, all inputs to transistor 3 are grounded. The output from transistor 3 to the base of transistor 4 in flip-flop 1006 is then negative battery turning on transistor 4 and turning off transistor 5. This applies negative battery to the base of transistor 6 turning it on. Ground is then applied to transistor 7 turning it off. Negative battery is applied to the base of the transistors in logic units 801 through 808. This provides a ground output from each and prevents transfer of the contents of the shift register. Thus, a failure of the overall parity check prevents acceptance of the message.

How a failure of the station selection parity checks also prevents acceptance will now be described. With respect to the parity checks for station selection, if the parity check for the first or second character for a particular station fails, the one's counter for that station is arranged to apply ground through whichever one of conductors 1030 or conductor 1031 is grounded when the assigned odd or even parity fails. For the check on the fifth cycle for character one, the connection is made to the base of transistor 1 in logic unit 1004 and for that on the tenth cycle, for character two, it is made to the base of transistor 2 in logic unit 1005. If there is a parity check failure at any of the stations for the first character, transistor 1 in unit 1004 is turned off during phase three of the fifth time interval. A failure on the second character will turn off transistor 2 in logic unit 1005 during phase three of the tenth time interval. As in the case of failure of the overall parity check, failure of the parity check on either of the two characters applies negative battery to the base of transistor 4, which results as has been shown, in non-acceptance of the message.

Transistors 1, 2, and 3 in units 1004, 1005, and 1006 in the receiving gate logic unit, FIG. 10, are connected to the stages of the program counter in such manner that they can be turned off during phase three of time intervals five, ten and eleven, respectively, on failure of parity. Reference to table one shows that, when the binary counting is limited to counting in the decimal range 0 through 11, connections to only three of the four stages are necessary to define any of these numbers. During time intervals five, ten and eleven, when the counter is at binary counts four, nine and ten, in binary notation 0100, 1001 and 1010, respectively, the counts may be identified by permutation –100, 1–01 and 1–10, respectively, where the symbol "–" means a blank. Therefore, the number may be identified by connection to three of the four stages only, omitting connection to the numbered stage corresponding to the position of the "–" symbol. This is of advantage because the number of connections which may be made to the base of the transistors may not exceed five, and six conductors would be required to be connected to the bases of each of the transistors in units 1004, 1005 and 1006 if connection were made to all four counter stages.

For the first character, defined by the combination –100, the base of transistor 1 in logic unit 1004 is connected through conductor 991 and 951 to the right-hand transistor in flip-flop 901 in counter stage one, which is grounded for the 0 condition. Until 1004 is connected through conductors 977 and 957 to the right-hand transistor in flip-flop 911 in counter stage two, which is grounded for the 0 condition. Unit 1004 is connected through conductors 972 and 962 to the left-hand transistor in flip-flop 921 in counter stage three, which is grounded for the 1 condition. No connection is made to counter stage four.

For the second character, defined by the permutation 1–01, the base of transistor 2 in logic unit 1005 is connected through conductors 976 and 952 to the left-hand transistor in flip-flop 901 of stage one of the counter which is grounded for the 1 condition. The base of transistor 2 in logic unit 1005 is connected through conductors 977 and 957 to the right-hand transistor in flip-flop 911 in counter stage two, which is grounded for the 0 condition. The base of transistor 2 in logic unit 1005 is connected through conductors 973 and 931 to the left-hand transistor in flip-flop 928 in counter stage four which is grounded for the one condition. No connection is made to counter stage three.

A phase three pulse is supplied from pulse generator 770 through conductor 743 to the base of the transistor in each of units 1004, 1005 and 1006, in parallel.

*Receiver Accept Gates*

The accept gate circuit is shown in FIG. 8 and its components in FIG. 30. The accept gate circuit comprises eight single transistors each individual to one of eight logic units 801 to 808 which units are activated so that they are in condition to read a message from the shift register circuit to the result register 800 in response to a ground signal from transistor 7 in logic unit 1001 in the gate logic unit, FIG. 10. If the output of transistor 2 in the left-hand flip-flop of any shift register stage is ground, the output of the individual accept gate to which it is connected will be inverted or negative battery. If the output of transistor 2 is negative battery the output of the accept gates will be ground. The result register circuit, it is assumed, will have an individual flip-flop circuit connected to each stage of the shift register which flip-flop circuit will be set to the one condition on the application thereto of negative battery from the output of its respective accept gate and will remain in the 0 condition in response to a ground signal therefrom. As explained in the foregoing failure of parity will result in the application of negative battery through conductor 1015 to the bases of all of the accept gates in parallel. The output of each accept gate will then be ground which will be ineffective to change the state of any connected flip-flop circuit in the result register. This will cause rejection of the message.

*Receiving Stop Gate*

Refer to FIG. 9, far right, and to FIG. 32. The receiver is stopped by the receiving stop gate when the program counter is switched to the binary eleven counting condition in response to the phase four pulse at the end of the eleventh time interval. It will be recalled that the shift, from one binary number counting condition of the counter to the next higher, takes place in response to the phase four pulse of the lower numbered time interval. That is to say, the shift from binary 0000 for decimal 0 to binary 0001 for decimal 1 occurs in response to the phase four pulse near the end of the first time interval. Each succeeding transition takes place at a corresponding time. So the binary counter will be switched to count eleven at the end of the eleventh time interval. The receiving stop gate switches the receiver to the off condition in response to the phase four pulse when the counter is switched to the eleven counting condition. As has been explained in binary notation eleven is 1011. As explained also this is uniquely defined when counting is limited to a maximum of eleven by the permutation 1–11. For this condition the base of the transistor 929 is connected to the left-hand transistor in flip-flops 901, 911 and 928 all of which are grounded for the 1 condition. The connection to unit 901 is through conductors 983 and 952, that to unit 911 is through 982 and 958 and that to unit 928 is through conductors 981 and 931. The phase four pulse is supplied from pulse generator 770 through conductors 744 and 948.

When the stop gate is turned off, negative battery is supplied through conductor 984 to stop the pulse generator.

What is claimed is:

1. A data transmission system in which binary digital messages are transmitted over a transmission line from a single station in blocks of equal-length characters composed of marking and spacing elements to a plurality of receiving stations comprising at said single station shift register means for storing temporarily a single message block, counting means for computing an odd and even parity check digit for each message character and for the overall block of message characters stored at one time, a station register for determining a particular permutation of odd and even parity check digits to be applied to each message block whereby one and only one receiving station can validly accept the message block, selecting means under the control of said station register for gating the correct permutation of odd and even check digits computed by said counting means to said shift register for insertion into said message block, and timing means for controlling the rate at which the contents of said shift register are transferred to said transmission line; and at each receiving station means connected to said transmission line for recomputing parity check digits in the received message block according to the particular permutation of odd and even check digits assigned to that station, and means for rejecting any message block for failure of the recomputed partity check digits to agree with the transmitted check digits.

2. In a data transmisison system an arrangement for providing a combined protective and address coding for a plurality of remote receiving stations comprising a source of binary data employing equal-length message characters having marking and spacing elements, means for temporarily storing a fixed block of said message characters from said source in parallel form, a transmission line, means for sequentially shifting the elements of said stored characters onto said transmission line, means for counting the marking elements in each message character as they are shifted onto said line, means under the control of said counter for inserting a checking element at the end of each message character indicative of the oddness or evenness of the number of marking elements in each character, an address register for said receiving stations, parity control means responsive to the output of said address register for determining according to a preselected plan whether the checking elements inserted at the end of each message character are odd or even, said plan being that each receiving station is assigned to a particular permutation of odd and even checking elements for the fixed block of message characters stored at one time, and final means for inserting at the end of each fixed block an overall checking element indicative of the overall oddness or evenness of each block including checking elements added by said inserting means.

3. In a data transmission system a source of binary data employing equal-length message characters, means for temporarily storing a fixed plurality of said characters, means for computing an individual parity check digit for each of said stored characters and a further overall parity check digit embracing both message digits and the last-mentioned individual parity check digits, a plurality of receivers, means for encoding address information for a particular one of said receivers in said check digits by permutating odd and even individual parity check digits according to a predetermined plan, and means for transferring said message and check digits from said storing means in sequential order to said transmission system.

4. A data receiving system for a binary digital message including a plurality of combined parity check and address code digits, the address being encoded as a unique permutation of odd and even parity check digits assigned to a particular receiver comprising means for computing a parity check digit for each character in a received message and an overall parity digit for a predetermined number of said characters, each parity check digit being respectively odd or even depending on the unique permutation assigned to each particular receiver, means for comparing the parity check digit encoded in the message and that obtained by said computing means, and logic means under the control of said comparing means for causing the rejection of any message upon the failure of any of the respective check digits to agree.

5. A data receiving system for a binary digital message in which a parity check digit is included for each equal-length message character and for each message block of predetermined length and in which the address of each receiving station is encoded as a permutation of odd and even counts represented by said check digits comprising means for computing a parity check digit for each character in a message block and for the message block itself according to the permutation address plan assigned to that particular receiving station, means for comparing the parity check digits encoded in the message with those obtained in said computing means in order to determine a failure of parity for either an error in the message or a permutation of check digits not assigned to the particular receiver, and means under the control of said comparing means for preventing the registration of either an incorrectly addressed message or a message in error.

References Cited in the file of this patent

UNITED STATES PATENTS

| | | |
|---|---|---|
| 2,674,727 | Speilberg | Apr. 6, 1954 |
| 2,719,959 | Hobbs | Oct. 4, 1955 |
| 2,884,487 | Young | Apr. 28, 1959 |
| 2,906,997 | Rabin et al. | Sept. 29, 1959 |
| 2,952,734 | Van Duuren | Sept. 13, 1960 |
| 2,954,432 | Lewis | Sept. 27, 1960 |